US010460332B1

(12) United States Patent
Kujat et al.

(10) Patent No.: US 10,460,332 B1
(45) Date of Patent: Oct. 29, 2019

(54) PREDICTING PERFORMANCE FOR PROVIDING AN ITEM

(71) Applicant: Amazon Technologies, Inc., Reno, NV (US)

(72) Inventors: Aaron Drew Alexander Kujat, Issaquah, WA (US); Avinash Chandra Saxena, Bellevue, WA (US); Joel Christopher Mosby, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 618 days.

(21) Appl. No.: 14/185,798

(22) Filed: Feb. 20, 2014

(51) Int. Cl.
*G06Q 30/02* (2012.01)

(52) U.S. Cl.
CPC ................. *G06Q 30/0202* (2013.01)

(58) Field of Classification Search
CPC ............ G06Q 10/06315; G06Q 10/06; G06Q 10/06312; G06Q 10/083; G06Q 10/0635; G06Q 10/0833; G06Q 50/30; G07C 2009/0092; G07C 9/00111
See application file for complete search history.

(56) References Cited

U.S. PATENT DOCUMENTS

| 9,639,908 | B1* | 5/2017 | Reiss | G06Q 50/12 |
| 2003/0033179 | A1* | 2/2003 | Katz | G06Q 10/063 |
| | | | | 705/7.12 |
| 2004/0015412 | A1* | 1/2004 | Shinbo | G02C 7/041 |
| | | | | 705/26.41 |
| 2004/0153357 | A1* | 8/2004 | De Sylva | G06Q 10/06315 |
| | | | | 705/7.25 |
| 2005/0137935 | A1* | 6/2005 | Lee | G06Q 50/12 |
| | | | | 705/15 |
| 2009/0164338 | A1* | 6/2009 | Rothman | G06Q 30/02 |
| | | | | 705/26.1 |
| 2010/0138355 | A1* | 6/2010 | Kodger, Jr. | G06Q 10/025 |
| | | | | 705/333 |
| 2010/0169000 | A1* | 7/2010 | Overgoor | G06Q 10/083 |
| | | | | 701/465 |
| 2012/0029963 | A1* | 2/2012 | Olding | G06Q 10/06 |
| | | | | 705/7.14 |
| 2012/0030134 | A1* | 2/2012 | Campbell | G06Q 10/0833 |
| | | | | 705/333 |
| 2013/0144745 | A1* | 6/2013 | Henderson | G06Q 10/06 |
| | | | | 705/26.2 |
| 2013/0144800 | A1* | 6/2013 | Fallows | G06Q 30/0282 |
| | | | | 705/341 |
| 2013/0268357 | A1* | 10/2013 | Heath | H04L 63/00 |
| | | | | 705/14.53 |

(Continued)

*Primary Examiner* — Renae Feacher
(74) *Attorney, Agent, or Firm* — Kilpatrick Townsend & Stockton LLP

(57) ABSTRACT

Techniques for predicted performance may be provided. For example, a computing service may be implemented to analyze information about past performances of merchants associated with providing items to consumers. Based on the analysis, the computing service may generate a performance prediction model. Further, the computing service may use the performance prediction model to determine a predicted performance for a particular merchant. Information about the predicted performance may be provided to various users including, for example, consumer and merchants.

24 Claims, 10 Drawing Sheets

(56) References Cited

U.S. PATENT DOCUMENTS

| | | | | |
|---|---|---|---|---|
| 2013/0290172 | A1* | 10/2013 | Mashinsky | G06Q 20/12 705/39 |
| 2013/0325737 | A1* | 12/2013 | Smalling | G06Q 10/083 705/330 |
| 2014/0019471 | A1* | 1/2014 | Linton | G06N 5/02 707/759 |
| 2014/0088865 | A1* | 3/2014 | Thies | G06Q 10/04 701/465 |
| 2014/0330741 | A1* | 11/2014 | Bialynicka-Birula | G06Q 10/0838 705/341 |
| 2015/0073929 | A1* | 3/2015 | Psota | G06Q 50/28 705/26.2 |

* cited by examiner

PREDICTING PERFORMANCE FOR PROVIDING AN ITEM

BACKGROUND

Users operate various computing devices to access online resources that offer a wide range of rich features and functionalities. For example, an electronic marketplace may allow merchants to offer items for sale and may allow consumers to search for, review, order, and/or purchase items. The electronic marketplace may provide multiple options to a consumer for obtaining a particular item. For example, the electronic marketplace may indicate various merchants of the item, compare prices across the merchants, allow a selection of various delivery methods, and/or facilitate a transaction between the consumer and any of the merchants. However, beyond allowing various delivery methods, the consumer may only be enabled to select a merchant based on price and/or rating.

BRIEF DESCRIPTION OF THE DRAWINGS

Various embodiments in accordance with the present disclosure will be described with reference to the drawings, in which.

DETAILED DESCRIPTION

Figure 1:
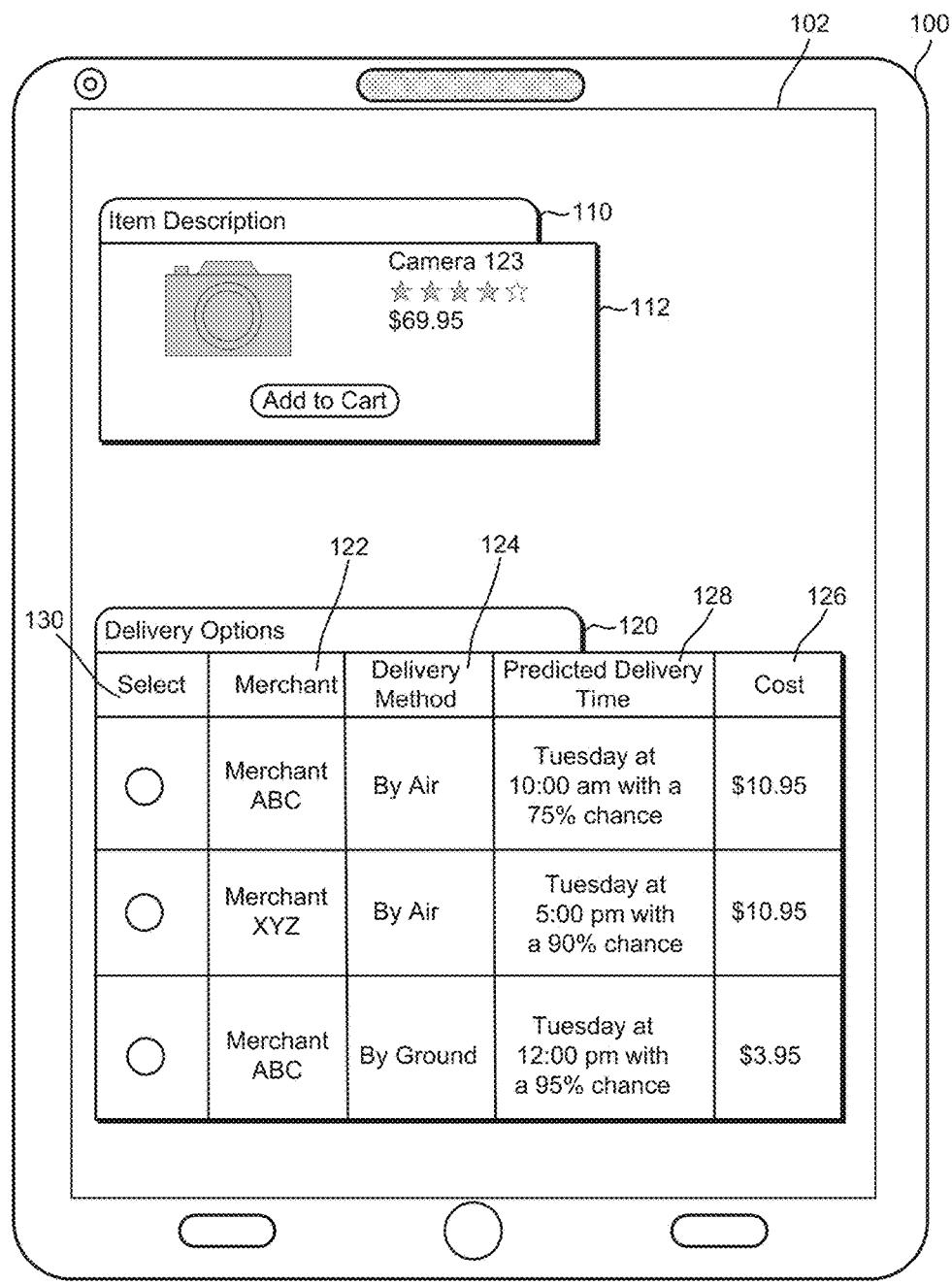
FIG. 1 illustrates an example user interface available for a consumer reviewing an item, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing a consumer's experience when, for example, ordering an item offered at an electronic marketplace. Specifically, a prediction service may be implemented for assisting a consumer in identifying expected delivery and/or order fulfillment time periods for different merchants. The prediction service may analyze past performances, such as delivery performances, of merchants offering the item at the electronic marketplace and may analyze contexts and conditions associated with the past performances to determine delivery times for the item. This determination may include pre-computing and/or dynamically computing predicted performances using, for example, a multi-input multi-output (MIMO) performance prediction model. As such, for each merchant, the prediction service may determine multiple predicted performances that may account for not only past performances of the merchant, but also for past performances of other merchants and various conditions and contexts. When the consumer browses for the item at the electronic marketplace, the prediction service can compare and inform the consumer of the predicted performances, allowing the consumer to select a merchant and/or an item associated with the merchant based in part on an associated predicted performance.

To illustrate, Joe, a consumer, may connect over the Internet to a web site offering a camera from multiple merchants, including Carl and Tony. The web site may implement the prediction service, allowing a determination of predicted delivery performances of the merchants. The predicted delivery performances may be based on past deliveries of the camera and/or similar items from Carl, Tony, and/or other merchants to consumers and may consider not only the past delivery performances, but also the used delivery methods, the used delivery routes, associated traffic or weather conditions, events along the routes, and/or other contexts and conditions. The web site may display a web page that may not only identify the merchants and the offered prices of the camera, but that may also inform Joe about a prediction for when the camera from each merchant may be provided and/or received. For instance, the web page may inform Joe that, for a same delivery method, Carl is expected to deliver the camera the next day by 10:00 am with a 90% certainty, while Tony is expected to deliver the camera also the next day but by 12:00 pm with an 80% certainty. Eager to get his hands on it as soon as possible, Joe may select Carl over Tony for ordering the camera even if Carl's camera costs more.

In the interest of clarity of explanation, the embodiments are described in the context of an electronic marketplace, service providers, items, merchants, and consumers. Nevertheless, the embodiments may be applied to any network-based resource (e.g., a web site), any item that may be tangible (e.g., a product) or intangible (e.g., a service), any service provider (e.g., a provider of a network-based resource, or a provider that may facilitate providing of an item), any merchant (e.g., an item provider, a seller, or any user offering an item at the electronic marketplace), and/or any consumer (e.g., an item recipient, a buyer, or any user reviewing, ordering, obtaining, purchasing, or returning an item). More particularly, the embodiments may allow the prediction service to predict performances of the merchants and to inform consumers about such predictions.

As explained herein above, the prediction service may determine a MIMO performance prediction model. The MIMO performance prediction model may be pre-computed and/or may be dynamically computed. For an item offered at the electronic marketplace, this model may account for past performances of the merchants in association with metrics, contexts, and conditions. For example, for a past delivery of a merchant, the prediction service may determine a time when the merchant shipped the item, a time when the item was delivered, a delivery method, a source location, a destination location, a route between the source location and the destination location, events associated with the route, traffic conditions along the route, weather conditions along the route, and other, metrics, contexts and conditions. This data may be available for the prediction service to mine from one or more resources of the electronic marketplace, such as from merchant, carrier, and consumer accounts stored at various databases. The prediction service may aggregate the data across past deliveries of the merchants to generate the prediction model. Further the prediction service may configure and use the prediction model in different ways. As used herein, shipping, delivering, obtaining, purchasing, receiving, and/or other actions associated with an item may include a unit of the item. For example, a merchant offering an item for sale and a consumer purchasing the item may include the merchant offering a plurality of units of that item for sale and the consumer purchasing a unit of the plurality of units.

In an example, the prediction service may generate a global predicted performance across the merchants. In other words, the prediction service may input contexts and conditions to the prediction model, and the prediction model may output a predicted performance that may apply to all merchants. In another example, the prediction service may generate a local predicted performance specific to each merchant. In this example, the prediction service may input an identifier of merchant, contexts, and conditions to the prediction model and the prediction model may generate a predicted performance specific to that merchant. In yet another example, the prediction service may generate a predicted performance that may fall in between, such as a hybrid predicted performance. In this example, the prediction service may also input an identifier of a merchant, contexts, and conditions to the prediction model. In turn, the prediction model may consider a set of data about the merchant and about other merchants that may share common parameters, and may output a predicted performance specific to that merchant, accounting for past performances of not only the merchant, but also of the other merchants. Common parameters may include common contexts and conditions. For instance, if the merchant ships the item from a particular location, using a particular route, the prediction model may consider other merchants that may have proximate locations and use similar routes.

When a consumer views an item at the electronic marketplace, the prediction service may determine consumer-related contexts and conditions, such as a desired delivery location (e.g., the consumer's location) and current events, traffic conditions, and weather conditions in an area associated with the delivery location. The predictions service may input this information to the prediction model to determine predicted performances of the merchants specific to that item and to the consumer. This may include, for example, retrieving and updating applicable predicted performances from the prediction model based on the consumer-related contexts and conditions. Further, the prediction model may indicate the predicted performances per merchant to the consumer, which may allow the consumer to understand how the merchants may be expected to perform. For example, the consumer may compare a time when each merchant is expected to deliver the item and how certain that delivery time may be.

Additionally, when the consumer selects and purchases an item from a merchant, the prediction service may monitor the progress of the item delivery from the merchant to the delivery location. If a deviation is detected from the contexts and/or conditions that may have been used to generate the predicted performance, the prediction service may update the predicted performance and inform the consumer accordingly. For instance, if the prediction service assumed that there was light traffic to the delivery location, but subsequently detects that an accident occurred leading to a half an hour traffic delay, the prediction service may inform the consumer of a half an hour delay. These and other features are further described herein below with reference to the figures.

Turning to FIG. 1, that figure illustrates an example computing device 100 that may be configured to allow a consumer to view predicted performances of merchants, such as predicted delivery performances. More particularly, the consumer may operate the computing device 100 to perform various interactions with an electronic marketplace, such as to search, review, and purchase an item. The electronic marketplace may implement a prediction service, similar to the one described herein above. In response to a consumer interaction, the electronic marketplace may cause the computing device 100 to present information about the item and the merchants, including the corresponding predicted delivery performances. To facilitate the consumer interactions, the computing device 100 may be configured to provide a user interface 102 that may use touch screen and other technologies.

The user interface 102 may include one or more windows that may display outputs of and may allow inputs to one or more processes. A web browser is an example of such processes and may be configured to present various types of information such as an item description 110 and delivery options 120. For example, the computing device 100 may execute the browser and connect to the electronic marketplace to retrieve and display the information on the user interface 102. It should be apparent to a person of ordinary skill in the art that other processes may be used such as, for example, a programmable application interface (API). Also, it should be apparent to a person of ordinary skill in the art that, although FIG. 1 illustrates the information as being simultaneously displayed in a same window of the user interface 102, this simultaneous presentation may not be necessary. Instead, some of the information may be presented in separate windows of the user interface 102.

The item description 110 may include various descriptions 112 of the item, such as an image or a graphic representation, a descriptive text, and a price of the item. In comparison, the delivery options 120 may include merchant-related information, such as information about selectable options for delivering the item. For example, the delivery options 120 may list the various merchants 122, various delivery methods 124 that the merchants 120 may offer, a cost 126 of each delivery method, and a predicted delivery performance 128. Also, the delivery options 120 may provide select fields 130 to allow a consumer selection of any one of the delivery methods 124.

The predicted delivery performance 128 may reflect information about the predicted performances of the merchants 122. For example, the predicted delivery performance 128 may include a predicted delivery time and a level of certainty for when the item may arrive at a delivery location, such as the consumer's location. The predicted delivery time may be expressed as a specific time (e.g., Tuesday, at 10:00 am), as a timeframe (e.g., Tuesday, between 9:00 am and 11:00 am), and/or in other time formats. Similarly, the level of certainty may be expressed as a quantitative likelihood (e.g., 75% probability), as a qualitative metric (e.g., a high chance), and/or in other certainty formats. Further, the predicted delivery time and/or the level of certainty may be displayed using a text format and/or a graphic format. For example, the predicted delivery time may be shown as an entry in a calendar, whereas the level of certainty may be shown as colored bar. A green bar may indicate a high level of certainty and a red bar may indicate a low level. Additionally, other formats for the predicted delivery performance 128 and, more generally, for the delivery options 120 may be used to compare the merchants 122 and to help the consumer more easily discern differences between the merchants 122, including delivery performance differences.

Hence, by operating the computing device 100 to interact with the electronic marketplace, the consumer may not only receive information about an item and merchants of the item, but also about how each merchant may be expected to perform. As such, the consumer may make a better informed decision regarding, for example, selecting a merchant with a predicted delivery performance that may best fit the consumer's needs.

As illustrated in FIG. 1, Merchant ABC and Merchant XYZ may be merchants of a camera. Merchant ABC may offer two delivery methods, one by air and one by ground, each of which may have a different cost and may have a different predicted delivery time. The by air method may be more expensive ($10.95), may deliver the camera earlier in the day (Tuesday, at 10:00 am), but may have a lower certainty level (75%) than the by ground option. In comparison, Merchant XYZ may offer one delivery method: by air, which may have a similar cost as to that of Merchant ABC but may have a different predicted delivery time. This option may deliver the camera later in the day (Tuesday, at 5:00 pm), but with a higher certainty level (90%). Eager to get the camera early in the day at a good cost, the consumer may select the by ground option of Merchant ABC because that option may be the cheapest of all three and may have the highest certainty level (95%) that the camera will be delivered on Tuesday, at noon. In other words, the consumer may select a merchant (e.g., Merchant ABC over Merchant XYZ) and a delivery method based on, for example, the predicted performance.

Figure 2:
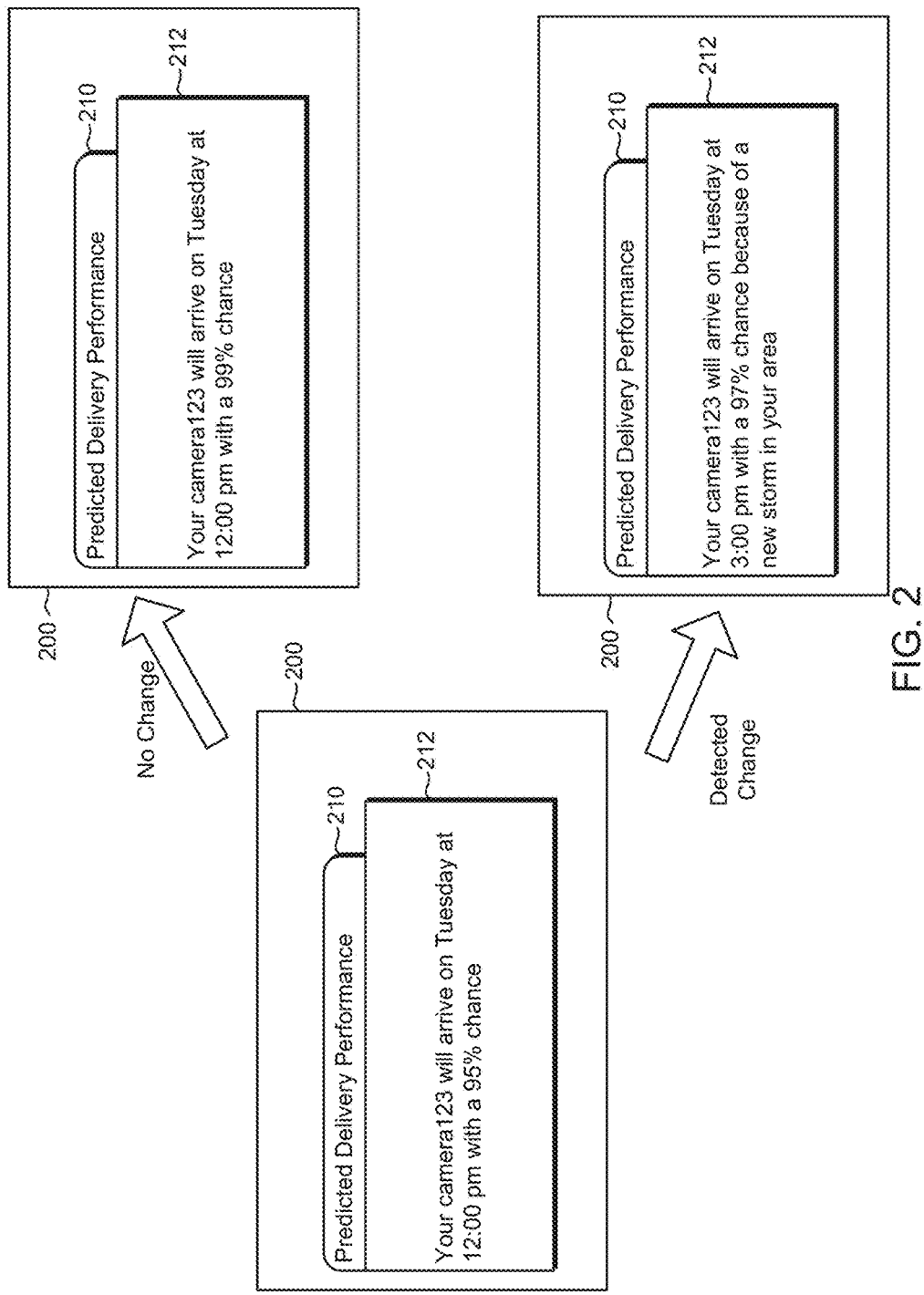
FIG. 2 illustrates example messages informing a consumer about predicted performances, according to embodiments.

Turning to FIG. 2, that figure illustrates an example for updating the consumer about a predicted performance, such as a predicted delivery performance. For example, the consumer may select a merchant and a delivery method and may purchase an item from an electronic marketplace. The electronic marketplace may implement a prediction service as the one described herein above. In addition to providing an initial predicted delivery performance at the time the consumer browses and/or purchases the item, the electronic marketplace (e.g., the prediction service) may monitor progress of the item delivery to a delivery location. This monitoring may include a comparison between a predicted delivery route and an actual route, along with associated parameters (e.g., contexts, conditions, and other parameters). Based on this monitoring, the electronic marketplace may update the consumer about the predicted delivery time and the associated certainty level. For example, if the electronic marketplace detects traffic jam, a weather storm, and/or some other event that was not initially considered in the predicted delivery performance, the electronic marketplace may determine the impact to the predicted delivery performance and inform the consumer accordingly.

As illustrated in FIG. 2, the consumer may receive a notification 200 about the predicted delivery performance. The notification 200 may be provided to the consumer at a user interface of a consumer computing device, such as the user interface 102 of FIG. 1, by email, by a text message, and/or through any other electronic form of communication.

The electronic marketplace may automatically provide this notification 200 at time intervals (e.g., every four hours initially, and every half an hour when the delivery time approaches). Additionally or alternatively, the notification 200 may be based on an event. For example, if a change is detected between a predicted route and an actual route or between the associated parameters, the electronic marketplace may generate the notification 200 to update the consumer.

The notification 200 may include a predicted delivery performance 210 that may be updated over time and/or based on an event. As illustrated in FIG. 2, the predicted delivery performance 210 may initially contain a description 212 of the predicted delivery time (e.g., Tuesday, at 12:00 pm) and an associated certainty level (e.g., 95%). If no change is detected, and as time gets closer to the expected delivery time, the electronic marketplace may update the predicted delivery performance 210 and notify the consumer as needed. For example, the electronic marketplace may determine that the certainty level has increased (e.g., from 95% to 99%) while the predicted delivery time has stayed the same (e.g., Tuesday at 12:00 pm). As such, the predicted delivery performance 210 may be updated to include a new description 214 reflecting this change in the certainty level. However, if the electronic marketplace detects a change (e.g., an unforeseen storm condition in the area of the consumer) and predicts that a certain delay (e.g., a three hour delay) would result but that the new predicted delivery time would increase in certainty level, the electronic marketplace may update the predicted delivery performance 210 accordingly. For example, the consumer may receive the notification with a new description 216 of the predicted delivery performance 210. The new description 216 may identify the change (e.g., storm in your area), the impact to the predicted delivery time (from 12:00 pm to 3:00 pm) and the change to the certainty level (e.g., from 95% to 97%). As such, the consumer may be always up-to-date on when to expect the arrival of the item.

Although FIGS. 1 and 2 describe providing information about predicted performances to a consumer, similar information may also be provided to a merchant. In other words, the prediction service may inform the merchant, by way of an interface and/or a notification, about a predicted performance and updates to such a performance. Further, this predicted performance may be specific to the merchant or may include information about predicted performances of other merchants or of all the merchants in general. This may allow the merchant to see where the merchant's performance rank in comparison to other merchants such that the merchant may determine various actions and/or best practices to improve, as needed, the performance.

Figure 3:
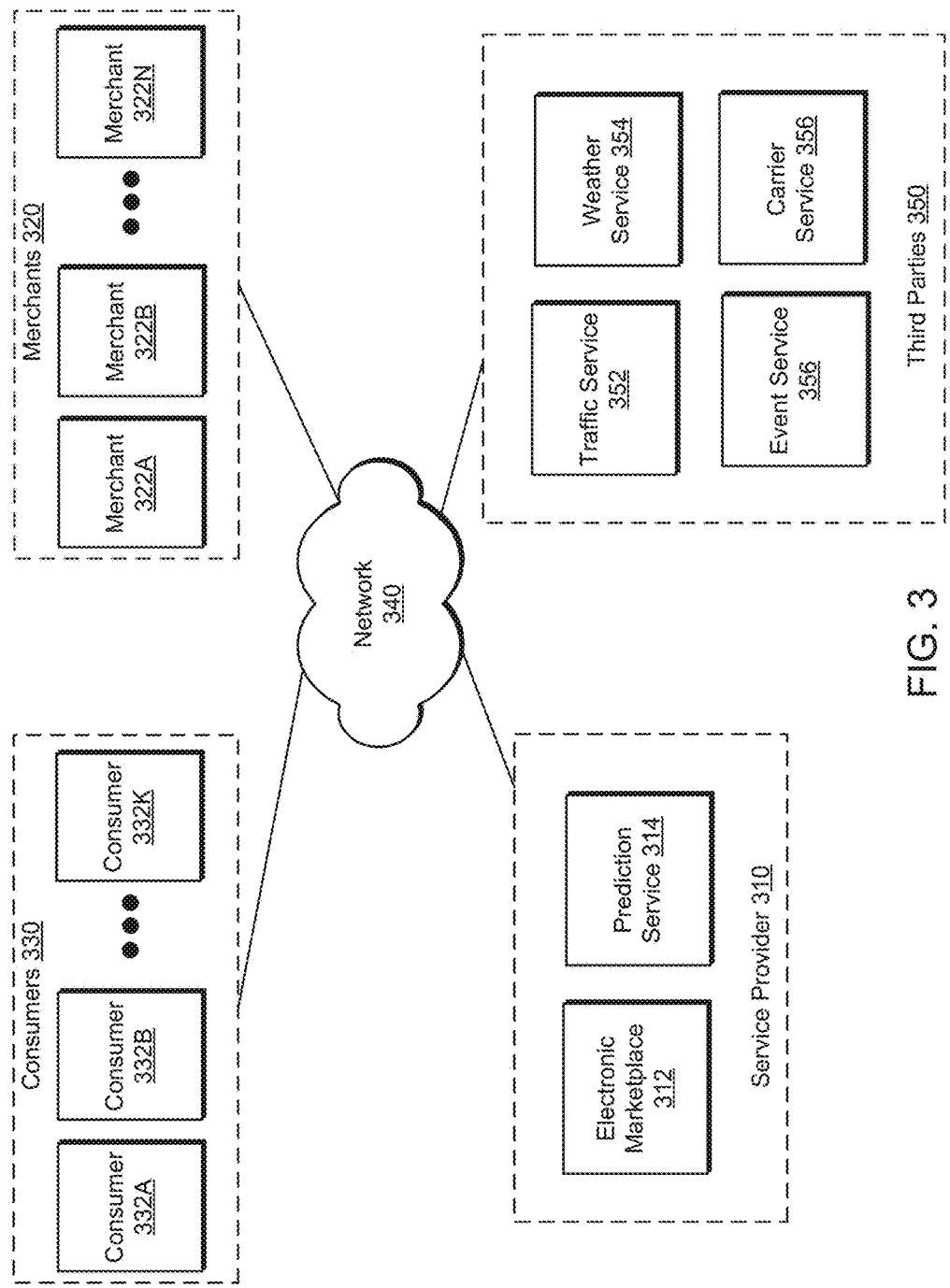
FIG. 3 illustrates an example computing environment for predicting performances, according to embodiments.

Turning to FIG. 3, that figure illustrates an example computing environment for implementing the techniques described herein. In particular, the illustrated computing environment may be configured to allow a service provider 310 of an electronic marketplace 312 to implement a prediction service 314. The prediction service 314 may determine (e.g., pre-compute and/or dynamically compute) predicted performances of merchants 320 and may inform consumers 330 and the merchants 320 of the predicted performances.

More particularly, the service provider 310, the merchants 320, and the consumers 330 may operate various types of computing devices to connect over a network 340. The service provider 310 may configure the electronic marketplace 312 to provide various functions and features to the merchants 320 and consumers 330, including for example, allowing the merchants 320 to offer items at the electronic marketplace 312 and the consumers 330 to review and obtain the items from the merchants 320 by way of the electronic marketplace 312.

As shown, there may be a large number of merchants 322A-322N. Each of these merchants may offer various items. The items may be offered not only at various prices, but also with various contexts. These contexts may include for example, delivery methods, source locations, an item lead time, an item delivery time, and other context information associated with the merchants. Similarly, there may be a large number of consumers 332A-332K. Each of these consumers may browse and/or order various items from the merchants 322A-322N under various contexts and various conditions. These contexts may include, for example, delivery locations, selected delivery methods, feedback about the items and/or performances of the merchants 322A-322N, and other context information associated with the consumers. Similarly, the conditions may be associated with deliveries of the items to the consumers 332A-332K such as traffic conditions, storm conditions, events, and other condition information. Such conditions may be available from third parties 350.

More particularly, the third parties 350 may provide various services that can be used to determine the conditions associated with the deliveries. For example, the third parties 350 may operate various computing devices to implement a traffic service 352 for providing traffic information, a weather service 354 for providing weather information, an event service 356 for providing event information (e.g., a football game in a city), a carrier service 358 for providing information about a route and progress of a delivery conducted by a carrier, and other services. This information may be correlated with the deliveries to the consumers 330. For example, when a consumer obtains an item, traffic, weather, event, and/or carrier information may be retrieved and tracked from the services 352, 354, 356, and/or 358 between the time the item leaves a source destination and the time the item arrives at a destination location.

Based on the information associated with the merchants 320, the consumers 330, and the third parties 350, the service provider 310 may configure the prediction service 314 to analyze and generate a MIMO predicted performance model and, accordingly, predicted performances of the merchants 320. This may include a multi-step approach. In an initial step, the prediction service 314 may mine the computing environment of FIG. 3 to collect the information. For example, the information may be aggregated in one location, such as a single database. In this example, the service provider 310 may configure the prediction service 314 such that, any time a merchant offers an item and/or a consumer orders the item, the prediction service 314 may record the associated information (e.g., the contexts and conditions) in the database. In another example, the information may be distributed across the computing environment such as at databases or accounts associated with the electronic marketplace 312, the merchants 320, the consumers 330, and the third parties 350. In this case, the prediction service 314 may query and retrieve the information from the various databases. In yet another example, if the information is distributed, the prediction service 314 may retrieve and aggregate the information in a single database.

Once the information is collected, a subsequent step may include generating the prediction model and the predicted performances. This approach is further described in the next figures. Briefly, the prediction service 314 may analyze the information using various machine learning and patterning algorithms to derive the prediction model. This may include determining past performances of the merchants 320 given the various contexts and conditions. Such past performances may be expressed as metrics (e.g., 60% on time given this set of contexts and conditions, and 90% on time given this other set of context and information).

The resulting prediction model may allow the prediction service 314 to output a predicted performance at various levels of granularity. For example, at the highest level, the prediction service 314 may generate a global predicted performance that may apply to all of the merchants 330 for a particular item. In comparison, at the lowest level, the prediction service 314 may generate a predicted performance for a particular item specific to a merchant under specific contexts and conditions (e.g., given a source location, a destination location, a delivery method, a route, an event, and weather condition, a traffic condition, and other information, the predicted performance of that seller for the item may include a predicted delivery time, a certainty level, a predicted route, predicted contexts and conditions, and other predicted information). A prediction specific to a merchant may account for information specific to that merchant and to other merchants, such as merchants that may have provided the item under similar contexts and/or conditions.

Hence, by leveraging knowledge about past performances of a large set of merchants 320 in association with a large set of consumers 330 and in light of large set of various contexts and conditions, the service provider 310 may predict future performances of any of the merchants 320 for any of the consumers 330 and under any context and/or condition. Similarly, by monitoring an item after leaving a source location by, for example, tracking the undertaken route and the associated contexts and conditions, the service provider may provide a corresponding consumer with up-to-date information about a predicted arrival of the item to a destination location. As such, a consumer may fathom, at the time the consumer reviews an item and throughout the delivery process of the item, how well a merchant may perform and an accurate time when the item may be received. Similarly, a merchant may have a deeper understanding of the merchant's performance on its own and in comparison to other merchants in view of various contexts and conditions. This may allow the merchant to customize some of the merchant's services and practices for a particular audience (e.g., some consumers, or some area of services).

Figure 4:
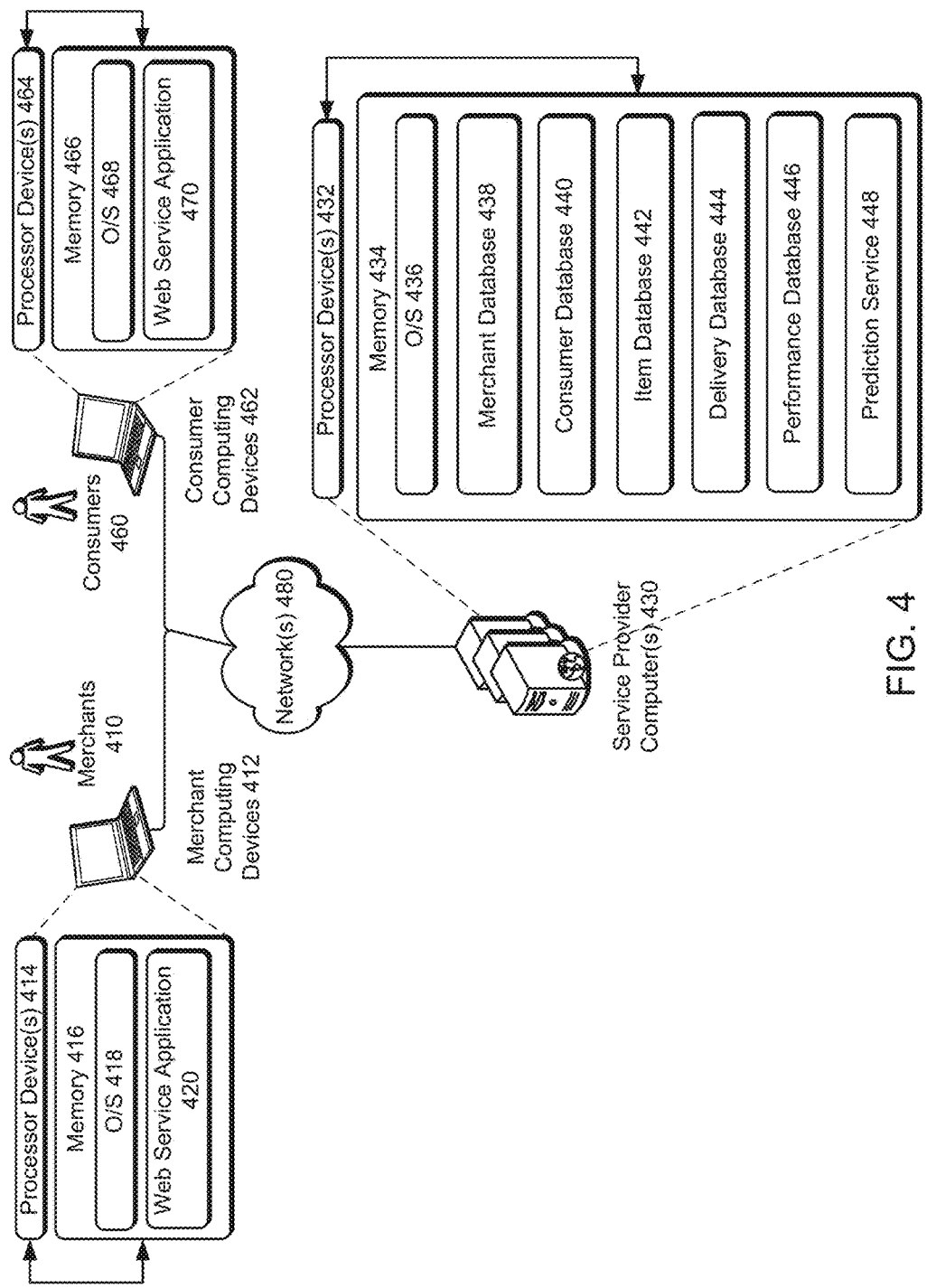
FIG. 4 illustrates an example architecture for predicting performances, including at least one user device or one or more service provider computers connected via one or more networks, according to embodiments.

Turning to FIG. 4, that figure illustrates an example end-to-end computing environment for predicting a performance of a merchant. In this example, a service provider may implement a prediction service, such as the prediction service 314 of FIG. 3, part of an electronic marketplace available to users, such as the merchants 320 and the consumers 330 of FIG. 3.

In a basic configuration, merchants 410 may utilize merchant computing devices 412 to access local applications, a web service application 420, merchant accounts accessible through the web service application 420, or a web site or any other network-based resources via one or more networks 480. In some aspects, the web service application 420, the web site, or the merchant accounts may be hosted, managed, or otherwise provided by one or more computing resources of the service provider, such as by utilizing one or more service provider computers 430.

The merchants 410 may use the local applications or the web service application 420 to interact with the network-based resources of the service provider. These transactions may include, for example, offering items for sale, informing the service provider about source locations, item lead times, when an item sold, when an item shipped, and other information.

In some examples, the merchant computing devices 412 may be any type of computing devices such as, but not limited to, a mobile phone, a smart phone, a personal digital assistant (PDA), a laptop computer, a thin-client device, a tablet PC, etc. In one illustrative configuration, the merchant computing devices 412 may contain communications connection(s) that allow merchant computing devices 412 to communicate with a stored database, another computing device or server, merchant terminals, or other devices on the networks 480. The merchant computing devices 412 may also include input/output (I/O) device(s) or ports, such as for enabling connection with a keyboard, a mouse, a pen, a voice input device, a touch input device, a display, speakers, a printer, etc.

The merchant computing devices 412 may also include at least one or more processing units (or processor device(s)) 414 and one memory 416. The processor device(s) 414 may be implemented as appropriate in hardware, computer-executable instructions, firmware, or combinations thereof. Computer-executable instruction or firmware implementations of the processor device(s) 414 may include computer-executable or machine-executable instructions written in any suitable programming language to perform the various functions described.

The memory 416 may store program instructions that are loadable and executable on the processor device(s) 414, as well as data generated during the execution of these programs. Depending on the configuration and type of merchant the computing devices 412, the memory 416 may be volatile (such as random access memory (RAM)) or non-volatile (such as read-only memory (ROM), flash memory, etc.). The merchant computing devices 412 may also include additional storage, which may include removable storage or non-removable storage. The additional storage may include, but is not limited to, magnetic storage, optical disks, or tape storage. The disk drives and their associated computer-readable media may provide non-volatile storage of computer-readable instructions, data structures, program modules, and other data for the computing devices. In some implementations, the memory 416 may include multiple different types of memory, such as static random access memory (SRAM), dynamic random access memory (DRAM), or ROM.

Turning to the contents of the memory 416 in more detail, the memory may include an operating system (O/S) 418 and the one or more application programs or services for implementing the features disclosed herein including the web service application 420. In some examples, the merchant computing devices 412 may be in communication with the service provider computers 430 via the networks 480, or via other network connections. The networks 480 may include any one or a combination of many different types of networks, such as cable networks, the Internet, wireless networks, cellular networks, and other private or public networks. While the illustrated example represents the merchants 410 accessing the web service application 420 over the networks 480, the described techniques may equally apply in instances where the merchants 410 interact with the service provider computers 430 via the merchant computing devices 412 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, consumers 460 may utilize consumer computing devices 462 to access local applications, a web service application 470, consumer accounts accessible through the web service application 470, or a web site or any other network-based resources via the networks 480. In some aspects, the web service application 470, the web site, or the user accounts may be hosted, managed, or otherwise provided by the service provider computers 430 and may be similar to the web service application 420, the web site accessed by the computing device 412, or the merchant accounts, respectively.

The consumers 460 may use the local applications or the web service application 470 to conduct transactions with the network-based resources of the service provider. These transactions may include, for example, searching for and purchasing an item.

In some examples, the consumer computing devices 462 may be configured similarly to the merchant computing devices 412 and may include at least one or more processing units (or processor device(s)) 464 and one memory 466. The processor device(s) 464 may be implemented as appropriate in hardware, computer-executable instructions, firmware, or combinations thereof similarly to the processor device(s) 414. Likewise, the memory 466 may also be configured similarly to the memory 416 and may store program instructions that are loadable and executable on the processor device(s) 464, as well as data generated during the execution of these programs. For example, the memory 466 may include an operating system (O/S) 468 and the one or more application programs or services for implementing the features disclosed herein including the web service application 470.

As described briefly above, the web service applications 420 and 470 may allow the merchants 410 and consumers 460, respectively, to interact with the service provider computers 430 to conduct transactions involving items. The service provider computers 430, perhaps arranged in a cluster of servers or as a server farm, may host the web service applications 420 and 470. These servers may be configured to host a web site (or combination of web sites) viewable via the computing devices 412 and 462. Other server architectures may also be used to host the web service applications 420 and 470. The web service applications 420 and 470 may be capable of handling requests from many merchants 410 and consumers 460, respectively, and serving, in response, various interfaces that can be rendered at the computing devices 412 and 462 such as, but not limited to, a web site. The web service applications 420 and 470 can interact with any type of web site that supports interaction, including any web sites of the third parties 350 of FIG. 3, social networking sites, electronic retailers, informational sites, blog sites, search engine sites, news and entertainment sites, and so forth. As discussed above, the described techniques can similarly be implemented outside of the web service applications 420 and 470, such as with other applications running on the computing devices 412 and 462, respectively.

The service provider computers 430 may, in some examples, provide network-based resources such as, but not limited to, applications for purchase or download, web sites, web hosting, client entities, data storage, data access, management, virtualization, etc. The service provider computers 430 may also be operable to provide web hosting, computer application development, or implementation platforms, or combinations of the foregoing to the merchants 410 and consumers 460.

The service provider computers 430 may be any type of computing device such as, but not limited to, a mobile phone, a smart phone, a personal digital assistant (PDA), a laptop computer, a desktop computer, a server computer, a thin-client device, a tablet PC, etc. The service provider computers 430 may also contain communications connection(s) that allow service provider computers 430 to communicate with a stored database, other computing devices or server, merchant terminals, or other devices on the network 480. The service provider computers 430 may also include input/output (I/O) device(s) or ports, such as for enabling connection with a keyboard, a mouse, a pen, a voice input device, a touch input device, a display, speakers, a printer, etc.

Additionally, in some embodiments, the service provider computers 430 may be executed by one more virtual machines implemented in a hosted computing environment. The hosted computing environment may include one or more rapidly provisioned and released network-based resources, which network-based resources may include computing, networking, or storage devices. A hosted computing environment may also be referred to as a cloud computing environment. In some examples, the service provider computers 430 may be in communication with the computing devices 412 and 462 via the networks 480, or via other network connections. The service provider computers 430 may include one or more servers, perhaps arranged in a cluster, or as individual servers not associated with one another.

In one illustrative configuration, the service provider computers 430 may include at least one or more processing units (or processor devices(s)) 432 and one memory 434. The processor device(s) 432 may be implemented as appropriate in hardware, computer-executable instructions, firmware, or combinations thereof. Computer-executable instruction or firmware implementations of the processor device(s) 432 may include computer-executable or machine-executable instructions written in any suitable programming language to perform the various functions described.

The memory 434 may store program instructions that are loadable and executable on the processor device(s) 432, as well as data generated during the execution of these programs. Depending on the configuration and type of the service provider computers 430, the memory 434 may be volatile (such as random access memory (RAM)) or non-volatile (such as read-only memory (ROM), flash memory, etc.). The service provider computers 430 may also include additional removable storage or non-removable storage including, but not limited to, magnetic storage, optical disks, or tape storage. The disk drives and their associated computer-readable media may provide non-volatile storage of computer-readable instructions, data structures, program modules, and other data for the computing devices. In some implementations, the memory 434 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 434 in more detail, the memory may include an operating system (O/S) 436, a merchant database 438 for storing information about the merchants 410, a consumer database 440 for storing information about the consumer 460, an item database 442 for storing information about items offered by the merchants 410, a delivery database 444 for storing information about past deliveries of the merchants 410, a performance database 448 for storing information about past performances of the merchants 410, and a prediction service 448. The delivery database 444 may store, for each delivered item, information about the delivery, such as when the source location, the destination location, the route, the used delivery method, the taken route, the actual delivery time, the contexts, the conditions, and other information. The performance database 448 may store information about a prediction model and predicted performances that the prediction service 448 may generate.

The service provider may configure the prediction service 448 to determine (e.g., pre-compute or dynamically compute) the prediction model and the predicted performances, to provide predicted performances to users (e.g., the merchants 410 and the consumers 460), to monitor changes in the delivery process, and to update the users accordingly, similar to the prediction service 314 of FIG. 3. The prediction service 448 may interface with any of the databases 438-446 for providing these functions. Although FIG. 4 illustrates the databases 438-446 as stored in the memory 434, these databases or information from these databases may be additionally or alternatively stored at a storage device remotely accessible to the service provider computers 430. Configurations and operations of the prediction service 448 are further described in greater detail below with reference to at least FIGS. 5-9.

FIGS. 5-8 illustrate example flows that can be implemented for predicting performances as described above in FIGS. 1-4. In the interest of clarity of explanation, a prediction service, such as prediction service 448 of FIG. 4, is described in FIGS. 5-8 as performing the flows. However, various components of the service provider computers 430 may be configured to perform some or all of the operations and other components or combination of components can be used and should be apparent to those skilled in the art.

Further, the example flows of FIGS. 5-8 may be embodied in, and fully or partially automated by, code modules executed by one or more processor devices of the service provider computers 430. The code modules may be stored on any type of non-transitory computer-readable medium or computer storage device, such as hard drives, solid state memory, optical disc or other non-transitory medium. The results of the operations may be stored, persistently or otherwise, in any type of non-transitory computer storage such as, e.g., volatile or non-volatile storage. Also, while the flows are illustrated in a particular order, it should be understood that no particular order is necessary and that one or more operations or parts of the flows may be omitted, skipped, or reordered. Additionally, one of ordinary skill in the art will appreciate that a computing device of a user, such as the computing devices 412 and 462 of the merchants 410 and the consumers 460, may perform corresponding operations to provide information to and allow interaction with the user.

Figure 5:
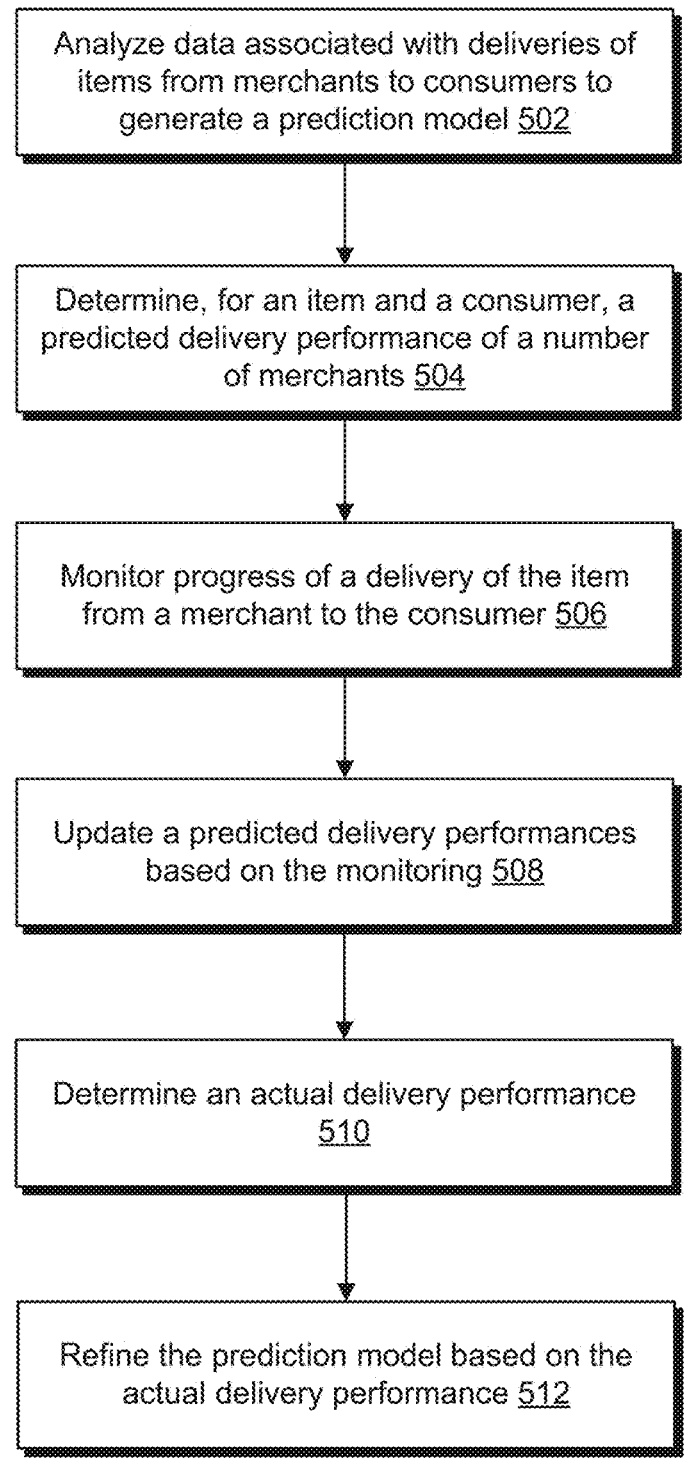
FIG. 5 illustrates an example end-to-end flow for informing a user about a predicted performance, according to embodiments.
Figure 6:
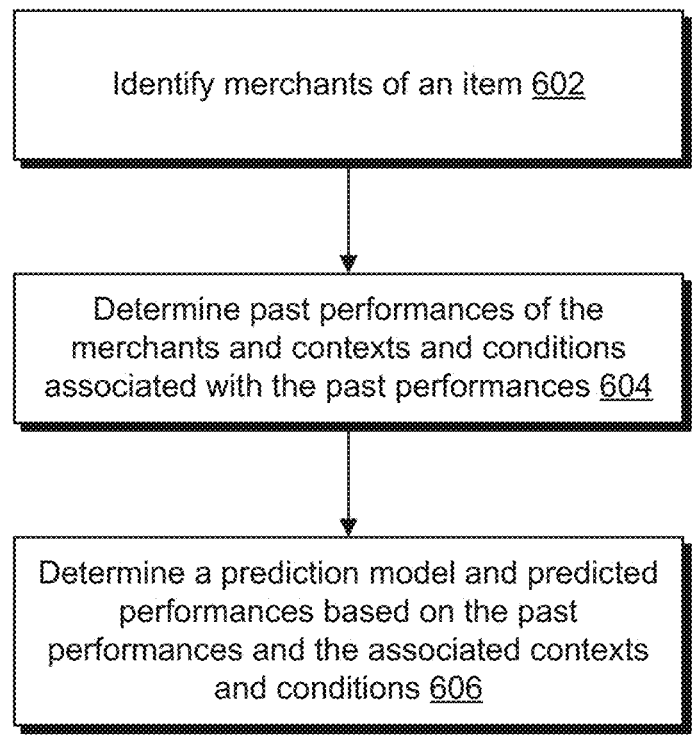
FIG. 6 illustrates an example flow for pre-computing a predicted performance, according to embodiments.
Figure 7:
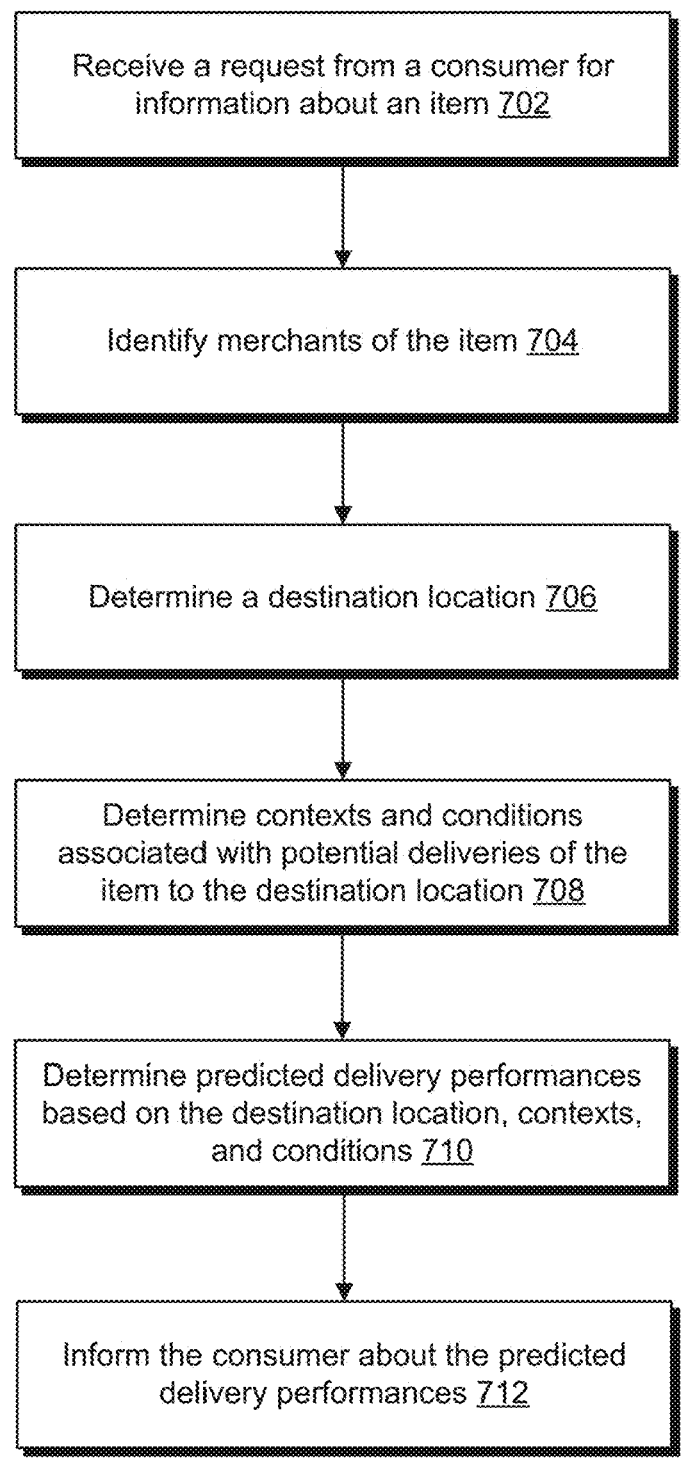
FIG. 7 illustrates an example flow for informing a user about a predicted performance based on user information, according to embodiments.
Figure 8:
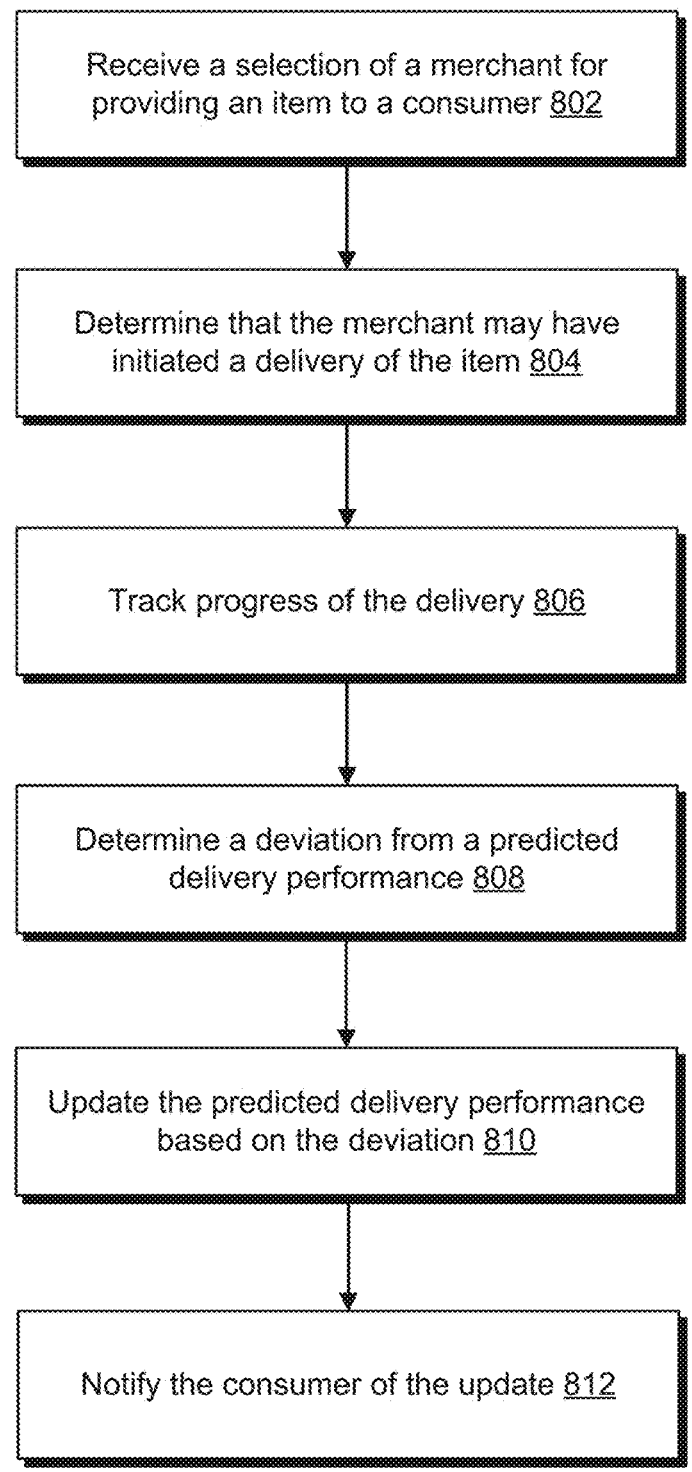
FIG. 8 illustrates an example flow for updating a predicted performance while an item is in transit, according to embodiments.

FIG. 5 illustrates an example flow that prediction service may implement for predicting and updating a performance and informing a user of such prediction. In the interest of clarity of explanation, a delivery performance is illustrated in the flow. However, other type of performances may similarly be predicted and updated. Further, a consumer is illustrated as requesting and receiving prediction information. Nonetheless, the requestor or the recipient of such information can be any user including, for example, a merchant. Operations of the example flow of FIG. 5 may be further embodied in operations of example flows of FIGS. 5-8. Thus, some operations of the example flows of FIGS. 5-8 may be similar. Such similarities are not repeated herein in the interest of clarity of explanation. FIG. 6 illustrates a more detailed example flow for determining predicted delivery performances. In comparison, FIG. 7 illustrates a more detailed example flow for providing a predicted delivery performance in response to a request from a consumer. FIG. 8 illustrates an example flow for updating a predicted delivery performance provided to a consumer.

Turning to FIG. 5, the example flow may start at operation 502, where the prediction service may analyze data associated with deliveries of items from merchants to consumers to generate a prediction model, such as a MIMO performance prediction model. This operation may include mining data stored within a computing environment for information about past deliveries from the merchants to the consumers. This information may include, for example, identifiers of the merchants and consumers, source locations, destination locations, delivery methods, delivery routes, delivery times, events, traffic data, and weather data associated with past deliveries, and/or other metrics or information associated with past delivery performances, contexts, and/or conditions. The prediction service can determine the prediction model by applying various algorithms to the information, such as machine learning and pattern recognition algorithms. In an example, the prediction service can pre-compute the prediction model before a request for information about an item is received from a computing device of a consumer. In another example, the prediction service can dynamically compute the prediction model in association with the request for information from the computing device of the consumer. The prediction model may allow the prediction service to generate a number of predicted performances. For example, by inputting an identifier of a merchant and a specific context, the prediction model may output a predicted delivery performance applicable to that merchant and specific to that context. An example flow for determining the prediction model and various predicted delivery performances is further illustrated in FIG. 6.

At operation 504, the prediction service may determine for an item and a consumer, predicted delivery performances associated with a number of merchants. For example, the prediction service may support hosting of a user interface. The consumer may operate a computing device to input at the user interface an identifier of the item (e.g., by searching for the item in a search field or browsing through a catalog). Likewise, the consumer may input at the user interface an identifier of the consumer, a destination location, or other context or condition information. However, some of this information need not be entered at the user interface. For example, the prediction service may determine a geo-location of the computing device and may set that location as the destination location. Similarly, the prediction service may interface with a third party service(s) hosted by a third party to retrieve context and condition information such as traffic information, weather information, event information in an area that may include the desired location and other locations.

Based on the identifier of the item, the prediction service may determine merchants of the item. For each, some, or all of these merchants, the prediction service may determine corresponding predicted delivery performance(s). For example, for a merchant, the prediction service may input an identifier of the merchant to the prediction model to retrieve a predicted delivery performance. This can be done at various levels of granularity. For example, for a more refined predicted delivery performance for a particular merchant, the prediction may determine contexts and conditions associated with that merchant. This may include determining a source location of the merchant, determining a delivery route(s) between the source location and the destination location, interfacing with the third party services to detect contexts and conditions along the delivery route(s), and inputting this information with information about the merchant and/or the consumer into the prediction model. In turn, the prediction model may output a predicted delivery performance that may account for the various types of information. This predicted delivery performance may include one or more of a predicted time of delivery, an associated level of certainty, a predicted route, predicted contexts associated with the delivery, and/or predicted conditions along the route. An example flow for determining the predicted delivery performances is further illustrated in FIG. 7.

Once the predicted delivery performances are determined, the prediction service may cause the user interface to be updated with such information. For example, the user interface may display and compare the predicted delivery performances for the various merchants. In turn, this may allow the consumer to make an informed decision when selecting a merchant by accounting for the merchant's predicted delivery performance.

At operation 506, the prediction service may monitor progress of the item delivery. This may allow the prediction service to update the user about changes to the predicted delivery performance. To do so, the prediction service may determine the merchant that the consumer selected and the corresponding predicted delivery performance. From this predicted delivery performance, the prediction service may determine a predicted route, predicted contexts, and predicted conditions. Further, as the item is in route, the prediction service may track progress of that item to determine deviations between the predicted route and the actual route, the predicted contexts and actual contexts, and/or the predicted conditions and actual conditions. Example techniques for determining these deviations are further illustrated in FIGS. 8 and 9.

At operation 508, the prediction service may update the predicted delivery performance based on the monitoring. This may allow the prediction service to provide up-to-date information in real or almost real-time to the consumer about, for example, the predicted delivery time and the level of certainty. To do so, for each detected deviations, the prediction service can determine an impact to the predicted delivery performance. This can be done by, for example, inputting that deviation, or the actual tracked value corresponding to the deviation, into the prediction model to further refine the predicted delivery performance. The impact may include, for example, a delay or an advance in the predicted delivery time, an increase or a decrease in the level of certainty, and/or other changes to the predicted delivery performance. Further, the prediction service may notify the consumer of this impact.

At operation 510, the prediction service may determine that the item was delivered to the destination location and a time of the delivery. To do so, the prediction service may implement various techniques. In one technique, the prediction service may interface with the third party services, such as a carrier service of a carrier that delivered the item, to retrieve the information. In another technique, the item may have been packaged in a package equipped with a geo-location wireless sensor. The prediction service may monitor and receive this location information. If the location information is not already time-stamped, the prediction service may add time stamps based on the receipt time. Once the transmitted location of the sensor matches the destination location, the prediction service may determine that the item is delivered and may set the corresponding timestamp as the actual delivery time. In yet another technique, the prediction service may cause the user interface to be updated with a field asking the consumer to specify whether the item was delivered at the predicted time, and if not, what the actual delivery time was. This operation may also include determining other information, such as the actual route that the item traversed and the associated actual context and conditions. This can be done by interfacing with, for example, the third party services to retrieve the information.

At operation 512, the prediction service may use the actual delivery time and any other actual information determined at operation 510 to further refine the prediction model. For example, the prediction service may store use this information to augment the data set used to generate the prediction model. The augmented data set can be used to further train or re-train applicable algorithms, such as machine learning algorithms. In another example, detailed analysis of deviations between the actual information and the predicted delivery performances can be performed and fed-back into the prediction model for refinement. For instance, if over multiple predicted performances, the prediction service determines that there may be a common deviation between predicted and actual performances, the prediction service may update the prediction model accordingly. In other words, the prediction service may update the prediction model to include an offset that may account for the deviation. As such, if the prediction service determines that there may be a common time deviation of about an hour (or some other time period) between predicted and actual time deliveries, the prediction service may tack an hour to predicted time deliveries.

Tuning to FIG. 6, that figure illustrates an example flow for determining predicted performances, including delivery performances, for a number of merchants. The predicted performances can pre-computed before a request for information is received for information specific to an item and/or merchant, and/or can be dynamically computed in association with such a request. For example, prior to receiving a request from information about an item, the prediction service may pre-compute predicted performances of merchants of that item. These performances may include predictions not only across the merchants, but also across a number of other parameters such as source locations, destination locations, routes, delivery methods, contexts, and/or conditions. Once a request is received from a consumer, the prediction service may determine and use one or more consumer-specific information to retrieve and update applicable pre-computed predicted performances and to provide the consumer with indications about the updated predicted performances. Similarly, once a request is received a merchant, the prediction service may provide information about pre-computed and/or updated predicted performances to the merchant.

In general, the prediction service may determine a prediction model based on information available about past performances of the merchants, including information about past deliveries to consumers and associated contexts and conditions. As explained herein above, such information may be collected and mined from one or more databases our sources within a computing environment that may include computing devices or systems of the merchants, the consumers, the service provider, and other third parties. For a predicted performance of a particular merchant, the prediction model may consider information specific to that merchant, information specific to another merchant or to a plurality of merchants, or information specific to that merchant and to another merchant(s). In another words, by using a large data set of information about past performances, the prediction service may improve the accuracy of the predicted performance of the merchant.

The prediction model may include a MIMO delivery performance prediction model that may accept various inputs and, accordingly, generate various predicted delivery performances. In other words, the prediction model may allow generation of predicted delivery performances at different levels of granularity. For example, the prediction service may input an identifier of an item. In turn, the prediction model may output a global predicted delivery performance applicable to all merchants of that item. In another example, the prediction service may input an identifier of an item, an identifier of a merchant, and an identifier of a source location. In turn, the prediction model may output predicted performances specific to that merchant and that source location, and applicable across various destination locations, contexts, and conditions.

The example flow of FIG. 6 may start at operation 602, where, for an item, the prediction service may determine merchants of that item. For example, the prediction service may query a merchant database or some other source at the electronic marketplace by identifying the item to retrieve identifiers of the merchants. The prediction service may repeat this operation for other items to allow the generation of a prediction model per item or a prediction model for the various items.

At operation 604, the prediction service may determine past performances and associated contexts and conditions. For example, for each merchant, the prediction model may determine past delivery performances of that merchant associated with deliveries of the item to consumer and the contexts and conditions surrounding the deliveries. Each of the past performances and associated contexts and conditions may include information about one or more of a time when the item was purchased, a lead time before delivery of the item was initiated, a source location from where the item was delivered, a destination location to where the item was delivered, a total time for the delivery, a route of the delivery, a delivery method, a carrier conducting the delivery, an event associated with the route, a traffic condition along the route, a weather condition during the delivery, and/or other information. As explained above, the prediction service may mine this information from a single database that may aggregate the information or from a plurality of databases or sources distributed throughout the computing environment.

At operation 606, the prediction service may determine a prediction model and predicted performances based on the past performances and the associated contexts and conditions. This prediction model may be specific to the item and/or may be included within a global prediction model for a plurality of items. The prediction service may apply various techniques for generating the prediction model including, for example, an application of one or more machine learning algorithms or pattern recognition algorithms. In these techniques, the prediction service may analyze the past performances and the associated context and conditions to predict, for example, delivery performances at various levels of granularity. The predicted performances may be grouped to form the prediction model.

In one technique, the prediction service may apply a machine learning algorithm that may regionalize the past performances, contexts and conditions in regions, that may find a best fitness region out of the regions, and that may use data of the best fitness region to generate the predicted delivery performances. For example, the prediction service may consider a tuple for training the machine learning algorithm. The tuple may be a data set that may include: <merchant identifiers, source locations, destination locations, delivery methods, routes, contexts, conditions>. The data set may be recursively analyzed in a hierarchical manner. For example, the hierarchy may follow the order listed in the tuple. As such, the prediction service may train the machine learning algorithm to output a predicted delivery performance across all the merchants. Nested within that prediction, the prediction service may train the machine learning algorithm to output a predicted delivery performance per merchant across all source locations. Similarly, nested within that prediction, the prediction service may train the machine learning algorithm to output a predicted delivery performance per merchant per source location across all destination locations. And so and so forth, up to, for example, a predicted delivery performance per merchant, per source location, per destination location, per delivery method, per route, per context, and per condition.

To illustrate, and considering an example of a predicted delivery performance per destination location, the prediction service may recursively sub-divide a set of all destination locations in regions. Depending on how large the set may be and how much computing resources may be available, the size of each sub-divided region may vary. For example, this size may be set to a street address, location coordinates (e.g. a range of GPS coordinates), a zip code, an area (e.g., grouping of zip codes or ranges of GPS coordinates), a city, a state, or other size levels. As such, the prediction service may start with one region that may represent a set of destination location and may proceed to recursively sub-divide the region into regions. In other words, starting with the large region, that region may be sub-divided in M×M regions, each of these sub-regions may be divided by N×N regions, and so on until each region has number of observations (e.g., actual data) optimized to train the machine learning algorithm. If a region has a larger number of observations, the prediction service may sub-divide that region. If a region does not have enough observations, the prediction service may add that region to a neighboring region.

Further, the prediction service may compute a fitness factor for each region. The fitness factor may be a measure of weighted average of past performances (e.g., on time deliveries) at a certain surety (e.g., 99%) for all destination locations in the region. The prediction service may give more weight to worse past performances. This may encourage a further sub-dividing of regions such that sub-regions with bad past performances may be identified and accounted for.

Across all of the regions, the prediction service may determine a number of regions that have the highest fitness factors. The past performances of these regions may be selected for the predicted delivery performances associated with the large region, which may represent the set of considered destination locations. As such, if these past performances indicate that delivery to that region is 95% on time, the prediction service can predict a delivery performance with a 95% certainty level. In another example, by similarly considering a source region (e.g., a set of source locations) and a route region (e.g., a set of route), if the parameters indicate that delivery to that the region is 90% on time and uses twelve hours, the prediction service can predict a delivery performance of twelve hours with a 90% certainty level.

In other techniques, the prediction service may implement a random forest machine learning algorithm. For this algorithm, the prediction service may consider a similar tuple as above at various hierarchies as described. The prediction service may run the tuple through each tree in the random forest, and may combine the results to produce the predicted performance deliveries. Each of the trees may include a binary decision tree having internal split nodes and leaf nodes. A split node may include a predicate against an input to the split node to determine whether the tuple should go to a left child node or a right child node of the split node. A leaf node may represent past performances of all of the observations (e.g., actual data) that may have reached that node. In other words, a cumulative distribution function (CDF) may be derived from a leaf and ma define distributions of the past performances. The prediction service may determine a predicted delivery performance for an input from the tuple (e.g., destination locations, source locations, both destination locations and source locations, and/or other inputs) from the combined CDFs of the lead nodes that may be reached by traversing the tree while applying predicates at each node against the input.

In yet another technique, the prediction service may implement a pattern recognition algorithm. Any appropriate pattern matching algorithm can be used to determine patterns in a considered data set. Similarly to above, various hierarchies of data sets may be considered in association with the above tuple. At each hierarchy, the prediction service may determine patterns from corresponding past performances. For each pattern, the prediction service may determine a level of certainty, frequency, and/or other metric. If a pattern meets a predefined criteria (e.g., a surety level over 99%), that pattern can be used to generate a corresponding predicted delivery performance. To illustrate, if the considered data set include a region of source locations, a region of destination locations, and a region of routes, and if the if the past performances associated with these regions indicate a pattern of 80% on time deliveries to the destination locations within eight hours from the source locations over the routes, the prediction service can predict a delivery performance of eight hours with a 80% certainty level.

The resulting predicted deliveries performances may be stored, organized, and indexed according to what each of the predicted delivery performances may represent (e.g., a level of hierarchy associated therewith) to form the prediction model. As such, by inputting an identifier of a merchant, a source location, a destination location, and/or any of the elements of the tuple, the prediction model may return the corresponding predicted delivery performance.

Turning to FIG. 7, that figure illustrates an example flow for providing information about predicted performances to a consumer. As explained herein above, in association with a consumer viewing an item by way of a computing device, the prediction service may determine predicted performances including, for example, predicted delivery performances of merchants of the item. For example, the prediction service may input identifiers of the merchants and, if available, information about the consumer into a prediction model associated with the item to retrieve the predicted delivery performances. Once retrieved, the prediction model may cause the computing device to display information about the predicted delivery performances, such as predicted delivery times and levels of certainty. Although, the example flow of FIG. 7 is described within a request from the consumer, a similar flow may apply for requests from merchants. For example, the prediction service may receive a request from a merchant for predicted delivery performances of the merchant and of other merchants and may respond with such information.

The example flow of FIG. 7 may start at operation 702, where the prediction service may receive a request from a consumer for information about an item. The request may identify, for example, the item. In an example, the request need not be directed to the prediction service or need not specify that information about predicted delivery performances is requested. Instead, the request may more generally be associated with the consumer visiting a web page of the electronic marketplace listing the item. In another example, the request may be specific for delivery performance information. In this example, the web page may display an option (e.g., a click button) selectable by the user for requesting the information.

At operation 704, the prediction service may identify merchants of that item. For example, the prediction service may use an identifier of the item to query a merchant database or some other source at the electronic marketplace to retrieve identifiers of the merchants.

At operation 706, the prediction service may determine a destination location. This location may be associated with a location for a potential delivery of the item. The prediction service may implement various techniques to make such a determination. For example, the prediction service may support an interface (e.g., the web page) at which the consumer may input a desired destination location. In another example, the prediction service may retrieve a location of the consumer from a consumer account and may set this location as the delivery location. In yet another example, the prediction service may receive and set a geo-location of a computing device of the user as the destination location.

At operation 708, the prediction service may determine one or more contexts and one or more conditions associated with a potential delivery of the item to the destination location. For example, for each identified merchant, the prediction service may determine one or more of locations from where the item may be delivered, routes for the potential deliveries to the destination location, delivery methods, events, traffic, or weather associated with the source locations, the route(s), or the destination location, and/or other information. To do so, using identifiers of the merchants and the destination location, the prediction service may query a database that may aggregate this information or a plurality of databases or sources of the electronic computing environment that may contain this information and may analyze the query results accordingly.

At operation 710, the prediction service may determine predicted delivery performances based on the destination location, the one or more contexts, and/or the one or more conditions. For example, the prediction service may input some or all of the information determined at operations 704-708 to a prediction model associated with the item to retrieve predicted delivery performances. Each of the predicted delivery performances may be associated with a merchant and applicable to the destination location. In other words, by using the prediction model, the prediction service may retrieve and update determined predicted delivery performances with information associated with the consumer (e.g., the destination location) and current contexts and conditions associated with the merchants, the consumer, and potential deliveries from the merchants to the consumers.

At operation 712, the prediction service may inform the consumer about the predicted delivery performances. For example, the prediction service may respond to the request with information about the predicted delivery performances. The response may cause an update to an interface (e.g., a web page) presented to the consumer by way of the consumer's computing device, where the update may display some or all of the information. For example, the interface may present to the consumer various available methods for each merchant and corresponding predicted delivery times and levels of certainty.

Turning to FIG. 8, that figure illustrates an example flow for updating a consumer about a predicted delivery. As explained herein above, following a selection by the consumer of an item from a merchant (e.g., a purchase transaction), the prediction service may determine progress of a delivery of the item, may update a corresponding predicted performance, and may notify the consumer of some or all of the updates. The prediction service may provide these updates based on an event (e.g., a detected change) and/or at time intervals (e.g., every so many hours).

The example flow of FIG. 8 may start at operation 802, where the prediction service may receive a selection of a merchant for providing an item to a consumer. For example, in response information about the item and available merchants, the consumer may select one of the merchants and complete a purchase transaction by way of a consumer computing device. Information about the selection or records of the transaction may be stored at a consumer account of the consumer and may include, for example, an identifier of the merchant and a destination location. The prediction service may determine from the consumer account that the consumer has purchased the item from the merchant.

At operation 804, the prediction service may determine that the merchant may have initiated a delivery of the item to the destination location. As explained herein above, the delivery from the merchant may be associated with a predicted delivery performance. This prediction may be based on predicted contexts and conditions associated with the merchant, the consumer, and the delivery. For example, in addition to the destination location and a selected delivery method by the consumer, the predicted delivery performance may be based on a predicted route between a source location and a destination location, a predicted event, traffic, and/or weather along the predicted route, and other information.

The prediction service may determine a start of the delivery using various techniques. In one technique, the prediction service may support an interface presented to the merchant at which the merchant may input a time when the delivery may have been initiated. In another technique, the prediction service may request the merchant to confirm the start by, for example, emailing the merchant at an email address and including in the email a link that the merchant can follow to confirm the start. In yet another technique, the prediction service can subscribe to a service of the merchant and/or a service of a carrier that the merchant may use. Upon the start of the delivery (e.g., in association with a scan of the item at a facility of the merchant and/or the carrier), the service may transmit information to the prediction service indicating the start.

At operation 806, the prediction service may track a progress of the delivery. For example, in response to determining that the merchant initiated the delivery, the prediction service may initiate a tracking of the delivery. This may include, for example, subscribing to the above service of the merchant and/or of the carrier. Various techniques may be implemented for the purpose of tracking. For example, the item may be tagged with or packed in a package tagged with a barcode. As the barcode is scanned along various points of the delivery route, the service of the merchant or carrier may transmit information about the scanning, including a time and location, to the prediction service. In another example, the item may be tagged with or packed in a package tagged with a wireless transmitter that may transmit location information (e.g., GPS coordinates). The location information may be directly transmitted to the prediction service or may be relayed thereto by the service of the merchant or carrier. This may allow the prediction service to continuously monitor the location of the item through the delivery. In yet another example, the item may be tagged with or packed in a package tagged with a barcode and may be loaded on a carrier vehicle. The loading may include scanning the barcode. In turn, the carrier vehicle may use a wireless transmitter for transmitting location information of the carrier vehicle. As such, by coupling the barcode scan with the location information of the carrier vehicle, the prediction service may continuously track the location information of the item once loaded on the carrier vehicle.

At operation 808, the prediction service may determine one or more deviations from the predicted delivery performance. For example, the prediction service may use the tracked information to determine an actual delivery route and actual times and may determine associated current contexts and conditions. This may include receiving information from the service of the merchant or carrier and/or other third party services (e.g., event, weather, and/or traffic services) about current contexts and conditions associated with the actual delivery route at the actual time. The prediction service may compare this information to the predicted contexts and conditions of the predicted delivery performance to determine deviations.

At operation 810, the prediction service may update the predicted delivery performance based on the one or more deviations. Various techniques may be implemented for this update and are further described in FIG. 9. For example, the prediction service may analyze the one or more deviations to determine an impact to a predicted delivery time. Based on this impact, the prediction service may update the delivery time. To illustrate, if the prediction service determines that the delivery is running a number of hours behind schedule and that no recourse is available, the prediction service may update the push the predicted delivery time by that number of hours. In another example, the prediction service may input the one or more deviations and/or the actual received information (e.g., actual route, current contexts and conditions, and other information) into the prediction model to receive an updated predicted delivery performance.

At operation 812, the prediction service may notify the consumer of the update. For example, the prediction service may display information indicative of updates made to the predicted delivery performance at an interface (e.g., a web page) accessible to the consumer, and/or may transmit such information to the consumer by way of an email, a text notification, and/or other means of electronic communications.

Figure 9:
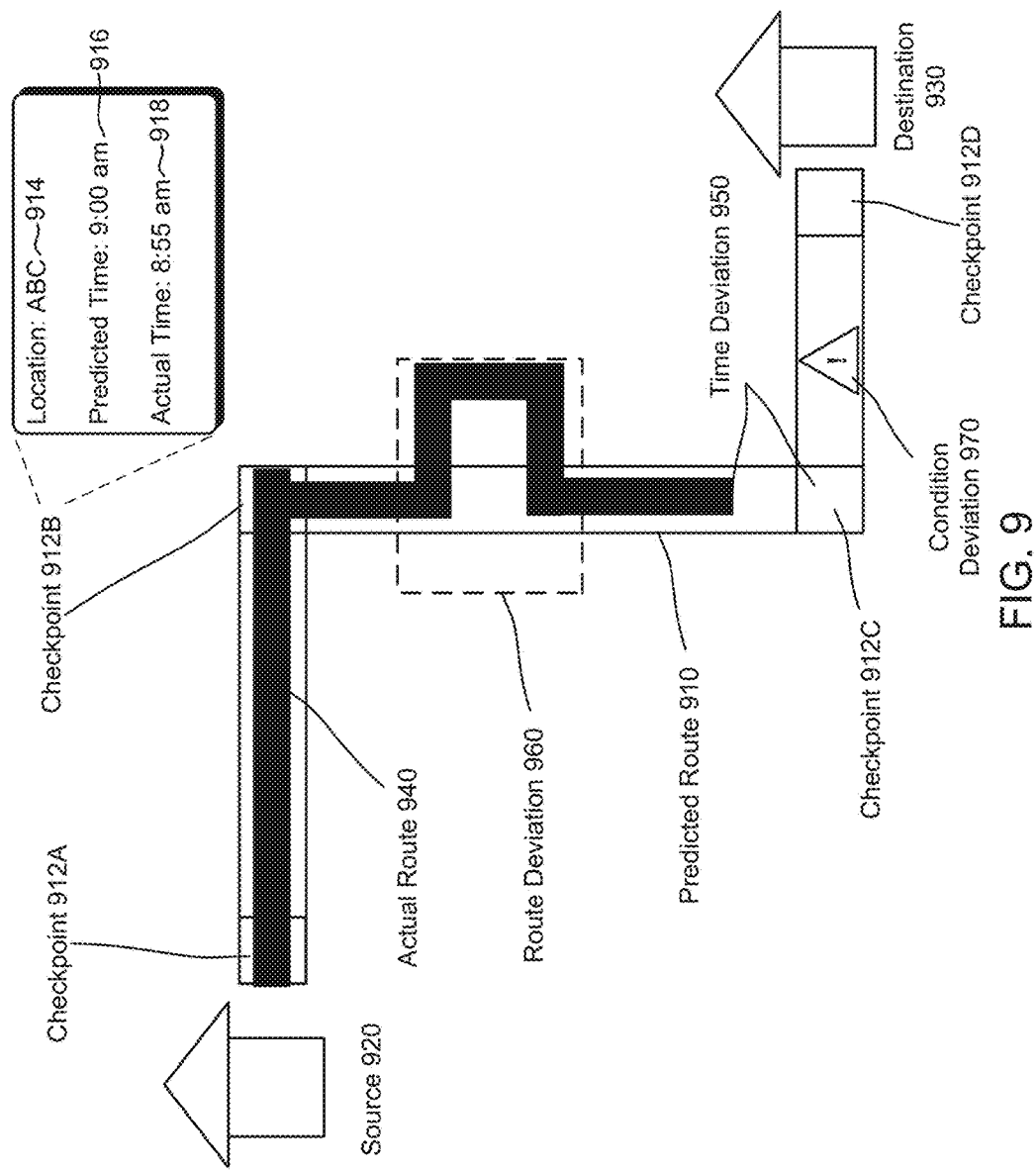
FIG. 9 illustrates an example monitoring of a predicted for generating updates, according to embodiments.

Turning to FIG. 9, that figure illustrates an example technique for tracking and determining deviations between a predicted delivery performance and an actual delivery performance. This technique may be implemented in a tool for updating a service provider, a merchant, and/or a consumer about a progress of an item delivery. The tool may include a graphical user interface (GUI) configured for viewing the accessible to the service provider, the merchant, and/or the consumer for viewing the tracking and the deviations.

As illustrated, the tool may visualize a predicted performance as a predicted route 910 between a source location 920 and a destination location 930. Along the predicted route 910, there may be a number of checkpoints 912A-912D. Each of the checkpoints 912A-912D may be at a location 914 of the predicted route and may include a predicted time 916 and an actual time 918. If the item checks at a checkpoint but at an actual time 918 different than the predicted time 916, the prediction service may determine a time deviation 950. Similarly, if the item does not check through a checkpoint (e.g., the actual delivery route does not travel through the checkpoint), the prediction service may determine a route deviation 960. Further, the tool may visualize an actual delivery route 940 and may compare the actual delivery route 940 to the predicted delivery route 910. A difference between the two routes may indicate the route deviation 960. Also, the tool may visualize a condition deviation 970. For example, if the prediction service determines that a traffic condition may have along the predicted route 910, the tool may display a warning corresponding to the deviation.

Figure 10:
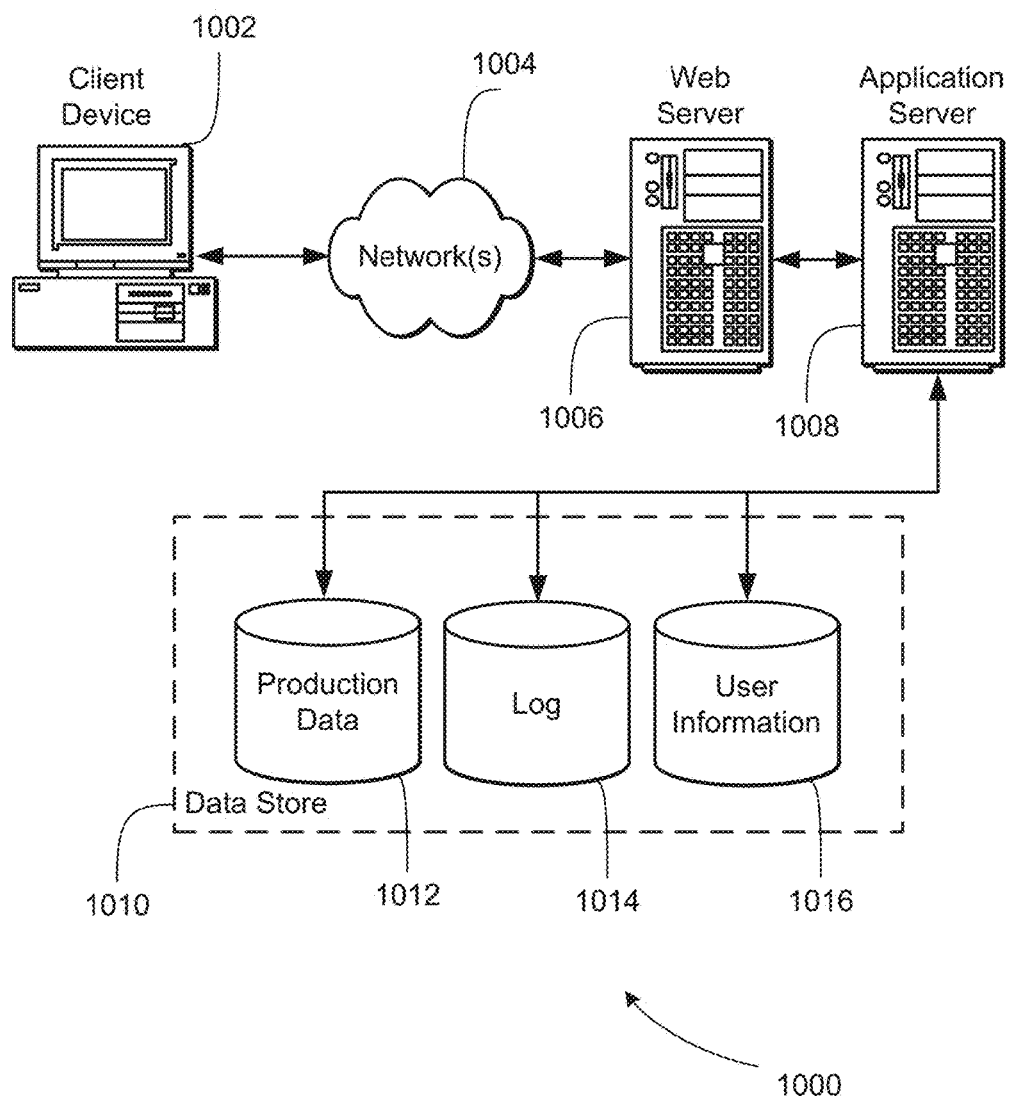
FIG. 10 illustrates an environment in which various embodiments can be implemented.

Turning to FIG. 10, that figure illustrates aspects of an example environment 1000 capable of implementing the above-described structures and functions. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network(s) 1004 and convey information back to a user of the device. Examples of such client devices include personal computers, cell phones, handheld messaging devices, laptop computers, set-top boxes, personal data assistants, electronic book readers, or any other computing device. The network(s) 1004 can include any appropriate network, including an intranet, the Internet, a cellular network, a local area network or any other such network or combination thereof. Components used for such a system can depend at least in part upon the type of network or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

the data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the client device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of environment 1000 in FIG. 10 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, or removable storage devices as well as storage media for temporarily or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising
storing, by a computer system, performance metrics for item providers offering an item at an electronic marketplace, the performance metrics indicative of past performances of the item providers associated with providing units of the item to destinations and of past contexts and past conditions corresponding to the past performances, a past context associated with a particular source and a particular destination of one of the units of the item, a past condition associated with a past route between the particular source and the particular destination, the past context and the past condition stored in one or more databases;
generating, by the computer system, a performance prediction model based at least in part on the performance metrics, the performance prediction model comprising a machine learning algorithm trained to output, for an item provider of the item providers, expected performances associated with providing a unit of the item, the expected performances varying based at least in part on potential contexts and potential conditions, wherein the machine learning algorithm is trained based at least in part on a tuple that comprises a nested hierarchy of elements, wherein the elements comprise merchant identifiers, source locations, destination locations, contexts, and conditions, wherein, upon completion of training, the machine learning model outputs the expected performances corresponding to levels of the nested hierarchy;

receiving, by the computer system from a computing device of a consumer, a web search request for information about the item based at least in part on a web site hosted by the computer system and on an access of the computing device to the web site;

determining, by the computer system, a context associated with providing the unit of the item from a source location associated with the item provider to a destination location associated with the consumer, the destination location determined as a geo-location of the computing device based at least in part on the access to the web site;

determining, by the computer system from the one or more databases, a condition associated with a route for providing the unit of the item to the destination location;

generating, by the computer system based at least in part on input to the machine learning algorithm, a performance prediction associated with the item provider, the performance prediction comprising a predicted delivery time for providing the unit of the item and a likelihood for meeting the predicted delivery time, the input comprising an identifier of the provider, the context, and the condition, the performance prediction corresponding to a particular level of the nested hierarchy, wherein the particular level comprises the elements of the tuple;

sending, by the computer system to the computing device of the consumer, a web page of the web site for presentation in response to the web search request, the web page comprising the performance prediction, the identifier of the item provider, the predicted delivery time, and the likelihood for meeting the predicted delivery time;

initiating, by the computer system, the providing of the unit of the item via a carrier based at least in part on a selection of the item provider, the selection received from the computing device of the consumer based at least in part on the web page;

sending, by the computer system to the computing device of the consumer, notifications about progress of the providing of the unit of item, the notifications generated based at least in part on location tracking of the unit of the item, the location tracking comprising receiving a time and a location from a subscription service based at least in part on a scan of a barcode associated with the unit of the item, the subscription service available based at least in part on a subscription with the carrier, the notifications generated based at least in part on times and locations;

detecting, by the computer system based at least in part on the location tracking, a deviation between at least one of: the context and an updated context, or the condition and an updated condition, the updated context and the updated condition associated with the providing of the unit of the item;

generating, by the computer system, an update to the performance prediction based at least in part on inputting the deviation to the machine learning algorithm, the update comprising at least one of: an updated predicted delivery time or an updated likelihood for meeting the predicted delivery time; and sending, by the computer system to the computing device of the consumer, a notification about the update to the performance prediction, the notification sent based at least in part on the deviation being detected and comprising a link to an updated web page, the updated web page comprising the updated predicted delivery time or the updated likelihood for meeting the predicted delivery time.

2. The computer-implemented method of claim 1, wherein the performance metrics are based at least in part on a historical delivery parameter of a second item provider, wherein the historical delivery parameter comprises one or more of: a second source location associated with the second item provider, a second route between the second source location and the destination location associated with the consumer, a historical condition associated with the second route, or historical delivery timing information.

3. The computer-implemented method of claim 1, further comprising:
determining whether the item provider initiated the providing of the unit of the item to the consumer;
determining a change to the context and a change to the condition; and
updating the predicted delivery time and the likelihood for meeting the predicted delivery time based at least in part on a second input to the performance prediction model, the second input describing the change to the context and the change to the condition.

4. The computer-implemented method of claim 1, further comprising:
determining an actual time for when the unit of the item was received at the destination location associated with the consumer; and
updating the performance prediction model based at least in part on the actual time.

5. A computer-implemented method, comprising
identifying, by a computer system, metrics associated with offering an item by item providers through a service provider, the metrics indicative of past performances of the item providers associated with providing units of the item to destinations and of past contexts and past conditions corresponding to the past performances, a past context associated with a particular source and a particular destination of one of the units of the item, a past condition associated with a past route between the particular source and the particular destination;

generating a performance prediction model based at least in part on the metrics, the performance prediction model comprising a machine learning algorithm trained to output, for an item provider of the item providers, expected performances associated with providing a unit of the item, the expected performances varying based at least in part on potential contexts and potential conditions, wherein the machine learning algorithm is trained based at least in part on a tuple that comprises a nested hierarchy of elements, wherein the elements comprise merchant identifiers, source locations, destination locations, contexts, and conditions, wherein, upon completion of training, the machine learning model outputs the expected performances corresponding to levels of the nested hierarchy;

receiving, from a computing device of a user of the service provider, a request for information about the item, the request received as a web search request based at least in part on an access of the computing device to a web site of the service provider;

determining a context associated with providing the unit of the item from a source associated with the item provider to a destination associated with the user, the destination determined as a geo-location of the computing device based at least in part on the access to the web site;

determining a condition associated with a route for providing the unit of the item to the destination;

generating, based at least in part on input to the machine learning algorithm, a prediction of a performance for providing the unit of the item from the source associated with the item provider to the destination associated with the user, the input comprising an identifier of the provider, the context, and the condition, the prediction corresponding to a particular level of the nested hierarchy, wherein the particular level comprises the elements of the tuple;

providing an indication of the prediction and the identifier of the item provider to the computing device of the user, the indication causing the computing device to present the prediction and the identifier in a web page of the web site;

tracking progress of the providing of the unit of the item via a carrier based at least in part on location tracking of the unit of the item, the location tracking comprising receiving a time and a location from a subscription service based at least in part on a scan of a barcode associated with the unit of the item, the subscription service available based at least in part on a subscription with the carrier;

providing, to the computing device of the user, updates about the progress, the updates generated based at least in part on the location tracking;

detecting, based at least in part on the location tracking, a deviation between at least one of: the context and an updated context, or the condition and an updated condition, the updated context and the updated condition associated with the providing of the unit of the item;

generating an update to the prediction based at least in part on inputting the deviation to the machine learning algorithm; and providing, to the computing device of the user, the update to the prediction, the update is provided based at least in part on the deviation being detected, the providing of the update causing the computing device to present the update in an updated web page of the web site.

6. The computer-implemented method of claim 5, further comprising:

prior to receiving the request, generating a plurality of pre-computed predictions of performances for providing the unit of the item to locations of other users;

determining, based at least in part on the request, the destination associated with the user;

selecting, based at least in part on the destination, a particular pre-computed prediction from the plurality of pre-computed predictions; and generating the prediction of the performance based at least in part on the particular pre-computed prediction.

7. The computer-implemented method of claim 6, wherein individual pre-computed predictions of the plurality of pre-computed predictions are generated based at least in part on one or more of: a source location, a destination location, a lead time, a method for providing the item, the route for providing the unit of the item, or the condition associated with the route.

8. The computer-implemented method of claim 6, wherein individual pre-computed prediction of the plurality of pre-computed predictions are based at least in part on historical data associated with a second item provider, wherein the historical data comprises timing performances associated with providing the item to the other users.

9. The computer-implemented method of claim 5, wherein generating the prediction of the performance comprises:

determining the destination associated with the user based at least in part on the request;

determining the source based at least in part on the item provider;

providing the destination and the source as an input to the performance prediction model; and setting an output of the performance prediction model as the prediction of the performance, wherein the output is based at least in part on the destination and the source location.

10. The computer-implemented method of claim 9, further comprising adjusting the output of the performance prediction model based at least in part on the route for providing the item and the condition associated with the route.

11. The computer-implemented method of claim 5, further comprising receiving, prior to receiving the request, data identifying that the item providers have provided items to the destinations, wherein the items are of a same type as a type of the item, wherein the past performances comprise timing performances associated with previous deliveries of the items to the destinations, and wherein the previous deliveries are associated with routes and route conditions.

12. The computer-implemented method of claim 11, wherein generating the prediction of the performance is based at least in part on the timing performances, the routes and the route conditions.

13. The computer-implemented method of claim 12, wherein generating the prediction of the performance further comprises:

determining the destination associated with the user based at least in part on the request for the information about the item;

determining the source of the unit of the item associated with the item provider;

determining a delivery method, the route, and a route condition associated with providing the unit of the item from the source to the destination; and updating the prediction based at least in part on the delivery method, the route, and the condition.

14. A system of a service provider, comprising:

a memory that stores computer-executable instructions; and a processor configured to access the memory and to execute the computer-executable instructions to collectively at least:

identify a plurality of item providers based at least in part on offers of an item by the plurality of item providers;

determine past performances of the plurality of item providers, the past performances associated with providing units of the item to a plurality of destinations within a region;

determine past contexts and past conditions corresponding to the past performances, a past context associated with a particular source and a particular destination of one of the units of the item, a past condition associated with a past route between the particular source and the particular destination;

generate a performance prediction model based at least in part on the past performances of the plurality of item providers, the past contexts, and the past conditions, the performance prediction model comprising a machine learning algorithm trained to output, for an item provider of the plurality of item providers, expected performances associated with providing a unit of the item within the region, the expected performances varying based at least in part on potential contexts and potential conditions, wherein the machine learning algorithm is trained based at least in part on a tuple that comprises a nested hierarchy of elements, wherein the elements comprise merchant identifiers, source locations, destination locations, contexts, and conditions, wherein, upon completion of training, the machine learning model outputs the expected performances corresponding to levels of the nested hierarchy;

at least in response to a request for information about the item from a computing device of a user received over a data network, identify the item provider, the request received from the computing device as a web search request based at least in part on an access of the computing device to a web site of the service provider;

determine a context associated with providing the item, the context comprising address information of a source associated with the unit of the item provider and of a destination that is within the region and that is associated with the user;

determine a condition associated with a route for providing the unit of the item to the destination associated with the user, the destination determined as a geo-location of the computing device based at least in part on the access to the web site;

generate, based at least in part on an input to the machine learning algorithm, an expected performance for the item provider given the address information of the context and given the condition, the input comprising an identifier of the item provider, the context, and the condition, the expected performance corresponding to a particular level of the nested hierarchy, wherein the particular level comprises the elements of the tuple;

provide, over the data network, an indication of the expected performance and the identifier of the item provider to the computing device of the user, the indication causing the computing device to present the expected performance and the identifier in a web page of the web site;

at least in response to an updated performance associated with the providing of the unit of the item from the source to the destination via a carrier, monitor a deviation between at least one of: the context and an updated context, or the condition and an updated condition, the updated context and the updated condition associated with the updated performance, the monitoring comprising receiving a time and a location from a subscription service based at least in part on a scan of a barcode associated with the unit of the item, the subscription service available based at least in part on a subscription with the carrier;

generate an update to the expected performance based at least in part on the deviation being input to machine learning algorithm; and provide, over the data network based at least in part on the deviation, a second indication of the update to the expected performance to the computing device of the user, the second indication causing the computing device to present the update to the expected performance in an updated web page of the web site.

15. The system of claim 14, wherein the expected performance comprises an expected time for when the unit of the item is expected to be provided to an item recipient, a likelihood for providing the unit of the item to the item recipient at the expected time, an expected route for providing the unit of the item to the item recipient, and an expected condition associated with the expected route.

16. The system of claim 15, wherein the computer-executable instructions further comprise computer-executable instructions that, when executed by the processor, cause the system to:
determine that the item provider initiated a providing of the unit of the item to the item recipient;
track the unit of the item before the unit of the item is received by the item recipient; and
update, based at least in part on the tracking, the expected time and the likelihood for providing the unit of the item at the expected time.

17. The system of claim 16, wherein the tracking comprises receiving one or more of: data indicative of a scan at a location on the actual route of a tag associated with the unit of the item, location coordinates of a sensor associated with the unit of the item along an actual route, or data indicative of a load of the unit of the item on a carrier and location coordinates of the carrier along the actual route.

18. The system of claim 15, wherein the expected performance is generated based at least in part on a location of the item recipient and a resolution associated with the location, wherein the resolution is selected from a set of resolutions based at least in part on the past performances, and wherein the set of resolutions comprises one or more of: a street address, location coordinates, a zip code, an area, a city, or a state.

19. One or more non-transitory computer-readable storage media storing computer-executable instructions that, when executed by one or more computer systems of a service provider, configure the one or more computer systems to perform operations comprising:
identifying a plurality of providers of an item;
receiving unit providing data associated with the plurality of providers providing units of the item to recipients, the unit providing data indicative of past performances of the plurality of providers for providing the units of the item and of past contexts and past conditions corresponding to the past performances, a past context associated with a particular source and a particular destination of one of the units of the item, a past condition associated with a past route between the particular source and the particular destination;
generating a performance prediction model based at least in part on the unit providing data, the performance prediction model comprising a machine learning algorithm trained to output, for a provider of the plurality of providers, expected performances associated with providing a unit of the item, the expected performances varying based at least in part on potential contexts and potential conditions, wherein the machine learning algorithm is trained based at least in part on a tuple that comprises a nested hierarchy of elements, wherein the elements comprise merchant identifiers, source locations, destination locations, contexts, and conditions, wherein, upon completion of training, the machine learning model outputs the expected performances corresponding to levels of the nested hierarchy;

receiving, from a computing device of a user, a request for information about the item, the request received as a web search request based at least in part on an access of the computing device to a web site of the service provider;

determining a context associated with providing the unit of the item via a carrier from a source associated with the provider to a destination associated with a user, the destination determined as a geo-location of the computing device based at least in part on the access to the web site;

determining a condition associated with a route for providing the unit of the item to the destination;

determining, based at least in part on input to the machine learning algorithm, a performance metric associated with providing the unit of the item by the provider to the destination associated with the user, the input comprising an identifier of the provider, the context, and the condition, the performance metric corresponding to a particular level of the nested hierarchy, wherein the particular level comprises the elements of the tuple;

determining, based at least in part on the performance metric, an expected delivery time for providing the unit of the item to the destination associated with the user;

tracking progress of the providing of the unit of the item, the tracking comprising receiving a time and a location from a subscription service based at least in part on a scan of a barcode associated with the unit of the item, the subscription service available based at least in part on a subscription with the carrier; and providing, to the computing device of the user, updates about the progress, the updates generated based at least in part on the tracking.

20. The one or more non-transitory computer-readable storage media of claim 19, wherein the operations further comprising instructing a computing device of the user to display an indication of the expected delivery time in response to a request for information about the item, wherein the indication comprises a comparison of the expected delivery time associated with the provider to a second expected delivery time associated with a second provider of the plurality of providers.

21. The one or more non-transitory computer-readable storage media of claim 19, wherein the expected delivery time is associated with a first method for providing the item by the provider to the user, and wherein the indication is based at least in part on a comparison of the expected delivery time of the provider to a second expected delivery time associated with a second method for providing the item to the user.

22. The system of claim 14, wherein the performance prediction model comprises a multiple input multiple output prediction model configured to output an expected performance per item provider, context, and condition based at least in part on the machine learning algorithm that regionalizes the past performances, the past contexts, and the past conditions in regions and finds a best fitness region out of the regions.

23. The system of claim 14, wherein the update to the expected performance is generated as a second output from the performance prediction model based at least in part on inputting the updated context and the updated condition to the performance prediction model.

24. The system of claim 14, wherein indications about expected performances are automatically provided based at least in part on an update rate that increases with a decrease of remaining time until an expected delivery time, and wherein the second indication is provided automatically based at least in part on the deviation and independently of the update rate.

* * * * *